US005995997A

United States Patent [19]
Horvitz

[11] Patent Number: 5,995,997
[45] Date of Patent: *Nov. 30, 1999

[54] APPARATUS AND METHODS FOR OPTIMALLY ALLOCATING CURRENTLY AVAILABLE COMPUTER RESOURCES TO FUTURE TASK INSTANCES VERSUS CONTINUED EXECUTION OF CURRENT TASK INSTANCES

[75] Inventor: Eric Horvitz, Kirkland, Wash.

[73] Assignee: Microsoft Corporation, Redmond, Wash.

[ * ] Notice: This patent is subject to a terminal disclaimer.

[21] Appl. No.: 08/850,409

[22] Filed: May 2, 1997

[51] Int. Cl.$^6$ .................................................. G06F 9/46
[52] U.S. Cl. ................................ 709/102; 709/103
[58] Field of Search ..................... 395/672, 673, 395/674, 670; 706/919, 922; 709/102, 103, 104, 100

[56] References Cited

U.S. PATENT DOCUMENTS

| | | | |
|---|---|---|---|
| 4,387,427 | 6/1983 | Cox et al. ................................ | 364/200 |
| 5,247,677 | 9/1993 | Welland et al. ......................... | 395/650 |
| 5,381,546 | 1/1995 | Servi et al. .............................. | 395/650 |
| 5,506,987 | 4/1996 | Abramson et al. ..................... | 395/650 |
| 5,526,521 | 6/1996 | Fitch et al. .............................. | 395/650 |
| 5,727,210 | 3/1998 | Dwork et al. ........................... | 395/674 |
| 5,784,616 | 7/1998 | Horvitz ................................... | 395/672 |

FOREIGN PATENT DOCUMENTS

0672990A2  9/1995  European Pat. Off. .

OTHER PUBLICATIONS

Chapter Four "Processes and Threads" of H. Custer, Inside Windows NT (©1993, Microsoft Press), pp. 83–97.
G. Cooper, "The Computational Complexity of Bayesian Inference Using Bayesian Beief Networks", Journal of Artificial Intelligence, 42(2):393–405, 1990.
P. Dagum et al, "Approximating Probabalistic Inference in Bayesian Networks is np–hard", Journal of Artificial Intelligence, 60(1):141–153, 1993.
D. Heckerman et al, "Toward Normative Expert Systems: Part 1 The Pathfinder Project", Methods of Information in Medicine, 31:90–105, 1992.
M. Henrion et al, "Decision Analysis and Expert Systems", AI Magazine, 12:64–91, Winter 1992.

(List continued on next page.)

Primary Examiner—Alvin E. Oberley
Assistant Examiner—Sue Lao
Attorney, Agent, or Firm—Michaelson & Wallace; Peter L. Michaelson

[57] ABSTRACT

Apparatus and accompanying methods for optimally using available computer resources, illustratively processing time, and which can be advantageously used for selecting task(s) instances to be precomputed during idle time as well as during other periods of processing activity. Specifically, at an onset of each idle-time interval, processing time is allocated to precompute during the remainder of that interval a future task instance, from among a group of such instances then available for precomputation, that will provide the highest fixed or incremental utility. For those task instances which exhibit constant or varying value with time, task selection is based on maximum probability of future occurrence, or net expected value (NEV), respectively, of each such instance. NEV is evaluated as a product of the task instance probability multiplied by a rate of change in the value (EVC flux) to be provided by that task with continued computation time, respectively. This product is assessed, for task instances that exhibit linearly changing value with time, at the onset of each idle-time interval, or, for task instances that exhibit non-linearly changing value, at the onset of each time slice occurring during such an interval. Processing time can be also allocated, at non-idle times, to precomputing a future task instance in lieu of continuing a presently executing task instance, if the future task instance then exhibits a time-discounted NEV that is larger than the EVC flux presently being provided by the currently executing task instance.

39 Claims, 6 Drawing Sheets

OTHER PUBLICATIONS

E. Horvitz et al, "Flexible Computation for Value of Information in Diagnostic Reasoning", AAAI Fall Symposium on Flexible Computation, AAAI, Menlo Park, CA, Nov. 1996.

E.J. Horvitz, et al, "Decision Theory in Expert Systems and Artificial Intelligence", International Journal of Approximate Reasoning, 2:247–302, 1988.

E.J. Horvitz, "Reasoning about beliefs and actions under computational resource constraints", Proceedings of Third Workshop on Uncertainty in Artificial Intelligence, pp. 429–444, Seattle, WA, Jul. 1987.

E.J. Horvitz, "Reasoning Under Varying and Uncertain Resource Constraints", Proceedings AAAI–88 Seventh National Conference on Artificial Intelligence, Minneapolis, MN, pp. 111–116, Morgan Kaufmann, San Mateo, CA, Aug. 1988.

E.J. Horvitz, "Rational Metareasoning and Compilation for Optimizing Decisions under Bounded Resources", Proceedings of Computational Intelligence 89, Milan, Italy.

M. Shwe, et al, "Probabalistic Diagnosis Using a Reformulation of the INTERNIST–1/QMR Knowledge Base–ii: Evaluation of Diagnostic Performance", Method of Information in Medicine, 30:256–267, 1991.

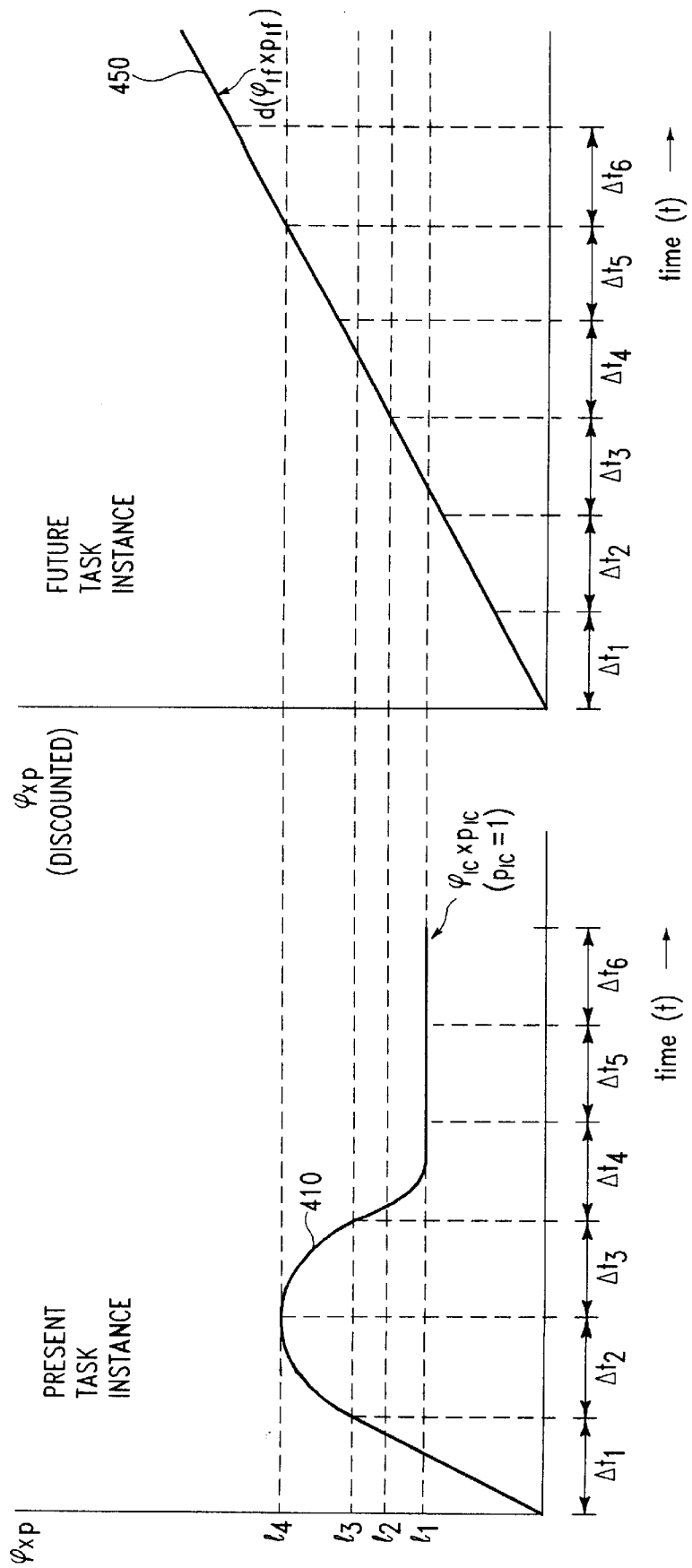
FIG. 4 PRESENT v. FUTURE TASK (DISCOUNTED)

APPARATUS AND METHODS FOR OPTIMALLY ALLOCATING CURRENTLY AVAILABLE COMPUTER RESOURCES TO FUTURE TASK INSTANCES VERSUS CONTINUED EXECUTION OF CURRENT TASK INSTANCES

BACKGROUND OF THE DISCLOSURE

1. Field of the Invention

The invention relates to apparatus and accompanying methods for optimally using available computer resources, illustratively processing time, and is ideally, though not exclusively, suited for selecting task(s) instances to be precomputed during idle, as well as during other periods of processing activity.

2. Description of the Prior Art

Generally speaking, a single computer processor, while executing a given software program and under control of an associated operating system, executes a series of atomistic processes—which collectively implement the program. However, in any single sequential Von Neumann type processor, only one such process executes at any one time. A significant response time imbalance often exists between a rate at which the processor itself executes instructions for a given process and the substantially slower response time of a resource, e.g. a hard disk drive or other mass storage facility, utilized by that processor. Hence, when the process requires use of such a resource, the operating system issues a request for the resource and then ceases executing the process, i.e. the process is suspended and simply waits, until the resource has properly responded to the request. This wait time can become significant if the resource is busy, i.e. unavailable, at the time the request is issued. While the process itself could not advance its execution pending the availability of the resource, the computer processor itself is often not so constrained.

The art, recognizing this dichotomy and given the widely divergent response times between a processor used in a computer system and other associated resources therein, teaches several techniques aimed at increasing computer utilization, and thus increasing throughput, by exploiting concurrency. All these techniques are characterized, in some form or another, by utilizing time, whether it be processing time and/or resource time, that would otherwise be spent simply waiting for something, such as a particular event, to occur and thus be wasted.

One such concurrency technique involves so-called "multi-tasking" through which a portion of a process, the portion commonly referred to as a "thread", is separately executable. Each thread has its own distinct program counter and represents a separate movement of a processor through a program instruction space. Rather than requiring a computer processor to execute a single unitary process or program from start to finish with intermediate wait (idle) intervals and potentially substantially wasted processing time, a single thread is executed at any one time but not necessarily to completion. A thread will continuously execute until either its execution is interrupted or that thread must wait for an associated resource which it then requires to become available. Once execution so ceases for a given thread, the computer, through context switching, begins executing another thread then queued for execution. Multi-threaded operation provides the illusion, given the relatively high processing speeds relative to that of other resources in the computer, of simultaneous execution of multiple threads and more generally of multiple programs. While the incorporation of context switching increases the amount of processing overhead consumed by the operating system, as a function of total available processing time, this increase is rather minor compared to the processing cycles that would otherwise be wasted during single-task processing and are consequently made available for execution of waiting threads. Consequently, multi-tasking provides significantly enhanced throughput over single task operation. As an example of a multi-tasking operating system is the Windows NT operating system currently available from Microsoft Corporation of Redmond, Wash., which is the present assignee hereof (and which also owns the registered trademark "Windows NT").

Further throughput enhancements arise through use of so-called "multi-processing". Rather than utilizing a single computer processor, a "multi-processing" based operating system executes on a computer that employs two or more separate processors which together operate concurrently. Illustratively, the Windows NT operating system not only provides multi-tasking but also accommodates so-called "symmetric multi-processing"; through the latter, any available one of a group of processors in a common computer can execute both operating system code and user (application) code. Additional throughput arises where a multi-processor operating system is also multi-tasking, i.e., as in Windows NT operating system, where each one of a group of processors can operate on a multi-tasked basis by effectively dividing its time among all waiting threads.

Additional concurrency-based throughput enhancements can arise through operating systems that use so-called "multi-threading". Oftentimes, executing two separate processes is not particularly efficient. Such inefficiencies arise where one process, i.e. a "parent" process, must create ("fork") another, i.e. "child", process and copy the contents of the address space of the parent process into that of the child process. This copying consumes a significant amount of time where relatively large address spaces are used. Moreover, the two processes must establish a way to share data therebetween, which, in certain operating systems, is rather difficult to accomplish. To avoid these inefficiencies, a multi-threaded operating system, a capability also inherent in the Windows NT operating system, permits each process to create its own threads, as a need arises to do so. For example, such additional threads are often used for asynchronous operations, i.e. operations (such as input/output, e.g. monitoring user manipulation of a mouse) that can occur at any time without regard to a main flow of the program. By using one thread to run a main program and creating another to monitor a device, the operating system can schedule both operations separately on a given processor to effectuate multi-tasking. When executing on a multi-processing computer, two threads can execute simultaneously, i.e. concurrently, and on different processors without a need for and the concomitant overhead associated with creating a second process and initializing its address space. Concurrency arises where a program creates two or more threads to execute different portions of a common program within the same process but on different processors. For additional detail on threads, multi-tasking, multi-processing and multi-threaded operation, the reader is referred to pages 83–97 of Chapter Four "Processes and Threads" of H. Custer, *Inside Windows NT* (© 1993, Microsoft Press).

While these concurrency-based throughput enhancing techniques have substantially increased computer throughput, additional room for improvement exists.

In that regard, even with an operating system, such as the Windows NT operating system, that utilizes multi-threading and multi-tasking, and which can accommodate multi-processing—to the extent it is used in any given computer system, a processor can still spend and waste time idling. This result can simply occur in those instances where, e.g., one thread is currently active but it is waiting for a resource to become available and no other threads are then queued.

In particular, where tasks that form any large processing job are well-organized, well-defined and hence can be tightly scheduled with respect to each other, such as in batch execution of large jobs on mainframe or similar computers, idling and resource wastage tend to be less pronounced. However, in personal computers, given, from the standpoint of the operating system, the wide diversity of tasks, their seemingly random nature of being executed (e.g. a user executing at any time a save or a spell check operation, or a web page access) as well as relatively long periods between the times a user manually executes separate successive tasks, idling and resource wastage can still be rather acute.

Moreover, not every computer, whether it is a personal computer or not, employs any of these concurrency-based throughput enhancing techniques.

Therefore, a need still exists in the art for apparatus and accompanying methods for optimizing the use of available processing time. Preferably, such an optimization should find ready application to a wide range of, if not substantially all, computers, apart from whether any such computer employs any concurrency enhancing technique, such as multi-tasking, multi-processing or multi-threading.

Furthermore and generally speaking, resource wastage, in a computer, is not confined to occurring just during idle time.

Specifically, computational activity, particularly with personal computers, is often marked by bursts of relatively high processing activity interspersed with intervals, usually somewhat long, of relatively low activity. During the latter intervals, low priority tasks, such as background or overhead processing of one form or another, occur. It is during these low activity intervals that some degree of available processing capacity either exists and is not being used, or is being allocated to relatively unimportant (i.e. low priority) tasks. In either case, some or all of this capacity is being wasted. In an interactive personal computer processing environment, high processing activity occurs during, e.g., downloading of an Internet page or other user-initiated operation, such as spell-checking in a word processing program or updating calculations in spreadsheet program. In contrast, low processing activity is typified by waiting for user input, such as for a user to appropriately manipulate a mouse and select, through clicking, a menu-based command for subsequent execution. Inasmuch as background tasks that execute during low processing intervals tend to be of lesser current importance (utility) and hence can usually be deferred, processing efficiency and hence system throughput would rise if, in some fashion, other tasks, of greater importance, could be determined and executed during these intervals.

In fact, further throughput enhancements could occur if computer resources, such as, e.g., processing time, could be allocated, even for use during periods of high activity, to those tasks in order of their current utility to a user rather than in just their order of pendency or priority.

In that regard and at first blush, one skilled in the art would think that those tasks having greater user and/or operational importance could be executed ahead of other pending tasks that either have lesser importance, but which were previously queued for execution, or are even currently executing. Most conventional personal computer operating systems permit a user to assign a priority to a certain task(s). For various application-based tasks, such as printing a document, or various utilities, their priority can be defined through the associated application or utility by, e.g., manual selection of a value in a range delimited by a software implemented slider, or depression of a button associated with a broad class of priorities, e.g. "high", "medium" or "low" priority. As against two pending tasks awaiting execution, the task with a higher priority would typically be dispatched for execution by the operating system ahead of such a task that has a lower priority. For critical system tasks, the operating system itself can assign different priorities among those tasks depending upon the relative importance the operating system ascribes to each of these tasks. The operating system can also permit the user to select a relative importance and hence a priority to those tasks collectively executing in foreground as against those collectively executing in background. Where the operating system is indifferent to task priority, user-specified priorities, to the extent they are used, may be employed to select one task over another for immediate execution. As one can appreciate, a task priority is often fixed and does not change unless, in the case of user-specified priority, the user manually changes it. Consequently, once a conventional operating system assigns a priority to a task, whether based on user selection or otherwise, that task, if invoked, will be queued for execution and will execute, if processing resources are available, ahead of all other pending tasks that have the same or lower priority. Once the task begins executing, its execution continues to completion, unless interrupted pending resource availability with the task resuming once the resource becomes available.

However, the utility of one task to a user vis-à-vis that of other tasks often changes during a given processing session. Task utility is influenced by current and future needs of the user with respect to his(her) application, historical user activity regarding that application, as well as by changes in the processing environment of the computer then being used. In that regard, a task that previously was of low importance to the user could in a given situation become extremely important to that user, thus deserving of an immediate change in priority with concomitantly immediate or very near-term execution relative to other pending and/or executing tasks. Other tasks, typically viewed as being important to that user, could, based on recent user activity, actually diminish in importance to that user and hence be relegated to a low priority with deferred execution. As of yet, given the difficulties associated with classifying tasks based on their current utility, no operating system appears to dynamically assess current task utility, based on these and similar user and system dependent factors, and schedule task execution accordingly.

Given this apparent omission in the art, operating systems frequently execute tasks, by virtue of their fixed priority assignments, that actually have less current utility to a user ahead of those that have greater current utility. This frustrates the user and further exacerbates resource wastage and, from the standpoint of the user, decreases system throughput.

Therefore, apart from a specific need to effectively utilize computer resources, such as available processing time, during idle-time intervals, a broad-based need continues to exist in the art to effectively and efficiently utilize available computer resources in properly selecting and executing tasks for current execution at any time. The solution to this need should assess dynamic changes in the current utility of a task to its user and select tasks for current execution accordingly.

SUMMARY OF THE INVENTION

The present invention satisfies this need by efficiently utilizing and particularly optimizing the allocation of computer resources independently of concurrency-based throughput enhancements.

In accordance with the broad teachings of the present invention, presently available processing resources, here illustratively processing time, are allocated, within a computer system, to a task instance that will provide the largest "value" (or benefit), i.e. current fixed or incremental utility or future cost saving, to a current user of that system. Such an allocation can occur during idle-time intervals, in order to select a future task instance(s) most suited for precomputation thereduring, and/or alternatively during other processing intervals, such as during intervals of high or low activity, to determine whether enhanced current value will arise by prematurely suspending a currently executing task instance in favor of precomputing a future task instance.

Specifically, such an allocation can occur at the onset of each idle-time interval to precompute, during the remainder of that interval and to the fullest extent possible, a future task instance(s) from among a group of such instances that, by minimizing delay at run-time, will provide the largest current value. The future tasks in the group would be re-evaluated at the onset of each successive idle-time interval to select the task, from the group as it then exists, which would be then be most appropriate for precomputation. Should additional time remain during any such interval, then the tasks then existing would be re-evaluated for possible precomputation during the remainder of that interval.

This value can be assessed, for those tasks that exhibit constant value over time, in terms of their future importance, e.g., in terms of a probability of future occurrence, i.e. that instance(s) which is the most likely to be executed in the future, or even a qualitative or quantitative rank ordering in terms of the value to be provided by these tasks. Future task instances can also be ordered, with respect to their future importance, in terms of future costs that would be incurred if the result of these tasks were to be delayed. For those task instance(s) that exhibit varying value with time, either linearly or non-linearly, processing time is allocated, during idle-time, to a task instance, whether that currently executing or one of a group of future task instances then available for precomputation, which maximizes "expected value of computation" (EVC), rather than just delay at run-time. This assessment involves determining, at the onset of each idle-time interval and for each such future task instance, that instance(s) which exhibits the largest EVC and then fully executing that instance(s), to the extent possible, during the remainder of this interval. EVC is assessed as a product of a probability of future occurrence of that task multiplied by a rate of change, i.e. "EVC flux", in value with computation time. For task instances that exhibit non-linearly varying value with time, EVC is assessed at the onset of regular relatively narrow time slices, rather than at the onset of a much wider idle-time interval.

Furthermore, in certain situations, a future task instance (s), if precomputed, could provide greater expected value than the value of a task instance which is currently executing. In that regard, a portion of current task execution could be intentionally degraded or that task completely terminated, hence retarding or even halting execution of that task instance and freeing processing capacity, in favor of allocating that capacity to such a future task instance.

In accordance with my specific inventive teachings, the desirability of continuing execution of a currently executing task instance vis-à-vis prematurely suspending the refinement of that instance in favor of precomputing a future task instance is assessed through use of discounted net expected value (NEV) exhibited by that instance. NEV is determined as a product, of the probability of a future task instance and its EVC flux, multiplied by a suitable time-discount factor. The currently executing task instance is terminated, i.e. suspended, in favor of precomputing a future task instance if, at the onset of a time slice, the latter instance exhibits a discounted NEV that exceeds the EVC flux then being provided by the former instance. Precomputation continues for the remainder of the time slice, with a re-evaluation of discounted NEV (including that of the suspended task instance) as against the EVC flux provided by the task instance then currently executing at the beginning of each successive slice, and so forth, in order to optimally allocate currently available processing resources to their best current use.

As a feature, my invention can also be employed not only to allocate processing resources, illustratively processing time, among tasks independently of their underlying application, but also to allocate processing time to application specific tasks that exhibit the largest current value, even where such a task invokes another application. Hence, in those situations during execution of a given application, such as a word processing program, where a high likelihood exists, based on a probabilistic-based assessment, that a user will invoke another application, such as a web browser, my invention can be used to determine whether to prematurely invoke the latter application during an idle-time interval in the former application. By precomputing, to the extent of the available idle-time, the latter application, in this case invoking, initializing and in particular for a web browser establishing a web connection and, if the idle-time permits, accessing a particular page, information likely to be requested by the user will be available just when the user requests it rather than, as conventionally occurs, necessitating that the user manually invoke the latter application and then wait for it to initialize and execute, as desired. Through such precomputation, delay previously associated with program initialization and, e.g., site access would occur prematurely and during an idle-time interval when that delay would neither be apparent to nor adversely affect a user. This, in turn, would advantageously increase application and overall system throughput.

My invention allocates processing resources to a task instance independently of how that instance is to be physically executed, i.e. on a multi-threaded, multi-processed and/or multi-tasked manner. Hence, as another feature, my invention can be fully utilized in conjunction with one or more conventional concurrency enhancing techniques to further increase system throughput.

BRIEF DESCRIPTION OF THE DRAWINGS

The teachings of the present invention can be readily understood by considering the following detailed description in conjunction with the accompanying drawings, in which:

FIG. 4 graphically depicts illustrative non-linearly varying φ×p curve 410 for a currently executing task instance and illustrative linearly varying discounted φ×p curve 450 associated with a future task instance, along with corresponding time intervals and values thereat for comparing, on a successive time-slice basis, value of the currently executing task instance vs. discounted φ×p of the future task instance;

To facilitate understanding, identical reference numerals have been used, where possible, to designate identical elements that are common to the figures.

DETAILED DESCRIPTION

Figure 1:
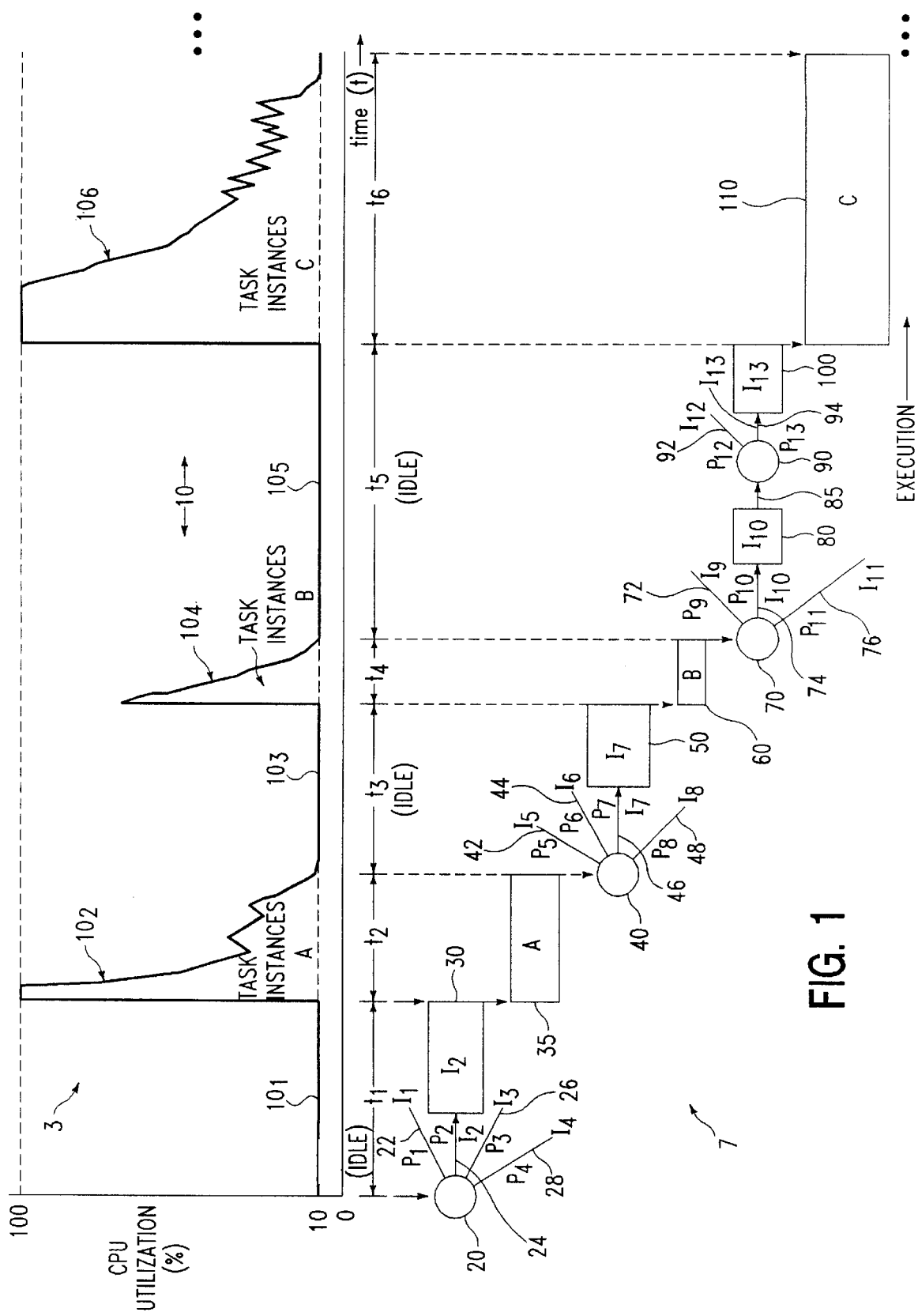
FIG. 1 depicts conventional CPU utilization diagram 3 and corresponding illustrative task chart 7, the latter showing task execution that could illustratively occur in accordance with the principles of the present invention to utilize idle-time intervals shown in diagram 3.

After considering the following description, those skilled in the art will clearly realize that the teachings of my present invention can be readily utilized in substantially any processing environment to provide enhanced overall throughput. Essentially, the present invention relies on allocating, within a computer system, presently available computer resources, such as currently available processing capacity existing at a given time, to an unexecuted task instance(s) that will provide the largest "value", i.e. current value or benefit, to a current user of that system. The task instances, when collectively viewed, can either be disparate from a given unitary application, or form part of a common application. This resource allocation is predicated on: (a) a probabilistic-based assessment of the near-term future occurrence of each task instance likely to occur in the future, and/or (b) assessing all task instances likely to occur in the future, in terms of their expected values, as against the value being provided by the task instance that is presently executing. Inasmuch as my invention allocates processing resources to a task instance independently of how that instance is to be physically executed, i.e. on a multi-threaded, multi-processed and/or multi-tasked manner, my invention can be fully utilized apart from or incorporated with one or more conventional concurrency enhancing techniques to increase system throughput. Use of any of these latter techniques, in conjunction with my invention, will provide an additional increase in system throughput. To simplify understanding, the term "task" is collectively defined, for use in conjunction with the following discussion, as encompassing any executable quantum of a program, regardless of whether that quantum is, e.g., a task as that word is commonly understood in the art, a sub-task or a thread. A task "instance" is defined to be a single execution of a corresponding task; hence, a task can have one or more instances associated with it. Moreover, to further simplify this discussion, I will describe my invention in the context of use in a uniprocessor computer system, and omit all details of multi-threaded and multi-tasked operation; all of which will become readily apparent to those skilled in the art after considering the following discussion.

To facilitate reader understanding, I will first discuss my invention, in detail, in the specific context of use, in an operating system, for selecting a task instance(s) for pre-computation, i.e. selecting and currently executing an instance that is likely to occur in the future and storing its results for future use—all ahead of time. I will address three different scenarios. Since these scenarios and the underlying concept of pre-computation are all independent of the particular application for which the task instances are executed or even the specific nature of the tasks themselves, for simplification, this discussion will purposely omit these latter aspects. The first two scenarios involve pre-computing, during a current interval of idle time, a task instance, from a group of instances that are likely to be executed in the future, wherein all these future task instances have: (a) fixed utility values, or (b) time-varying utility values. Thereafter, I will address the third scenario which involves prematurely terminating a task instance that is currently executing, regardless of when that task instance is executing, i.e. either during an interval of high or low processing activity (the latter including idle-time), in favor of precomputing a future task instance that possesses increased current utility over the currently executing task instance. These scenarios will be addressed first through a broad overview; which will then be followed by a discussion of the salient portions, both hardware and software, of a computer system that embodies these three aspects of the invention.

Thereafter, with this material in mind, I will then extend my inventive teachings, regarding probabilistic based precomputation, to describe how these teachings can be advantageously incorporated into different software-based applications, such as, e.g., a fault diagnosis system, to effectively use available computer resources therein and increase overall throughput of that application, as well as that of the entire computer system. From that discussion, the reader will be readily able to modify many other such software-based systems so as to employ my inventive teachings therein in order to increase the efficiency and effectiveness of these systems and, by so doing, further increase overall throughput of the computer system.

A. Conventional Atomistic Task Processing

Conventional central processing unit (CPU) utilization in, e.g., a personal computer (PC) on an atomistic level, is generally marked by short periods (e.g. pulses) of relatively high processing activity separated by periods, often longer, of relatively low processing activity, typically idle time. This phenomena is graphically depicted by curve 10 shown in diagram 3 of FIG. 1. This curve is typical of that generated for depicting real-time CPU utilization by a CPU usage history monitor feature selectable for display through a Task Manager process in the Windows NT version 4 workstation operating system; this operating system is currently available from Microsoft Corporation of Redmond, Wash. (which also owns the registered trademark "Windows NT"). Curve 10 illustratively contains three intervals of relatively high CPU activity, $10_2$, $10_4$ and $10_6$ (occurring during respective periods $t_2$, $t_4$ and $t_6$) during which task instances A, B and C respectively execute. These intervals are separated by interspersed idle-time intervals $10_1$, $10_3$ and $10_5$ (also denoted as periods $t_1$, $t_3$ and $t_5$, respectively). During each of these three idle-time intervals, a CPU is usually waiting for some other device, typically slower in speed than the CPU, to become available such that the CPU can resume its processing activity by utilizing that device, or data then available therefrom, in some fashion. The processing load that occurs during each of these idle-time intervals is relatively low, here depicted by illustratively 10% CPU utilization. In contrast, pulses $10_2$ and $10_6$, at least for part of their duration, fully utilize the CPU, i.e. to 100% of its processing capacity thereof; while pulse $10_4$ illustratively does not.

Given the processing capacity that is available, but heretofore generally wasted during each idle-time interval, increased system throughput could be had if a useful task(s) could be processed during each of these intervals.

B. Inventive Task Selection Algorithms for Yielding Optimal Resource Utilization Advantageously and in accordance with my basic inventive teachings, a task instance is selected at a beginning of each of these idle-time intervals and processed during the remainder of that interval. The selected instance is one that is most likely to occur in the near-future and will be precomputed, during an associated idle-time interval, to the extent of the remaining time available during that interval. Once this task instance has been precomputed, its results, partial if the task has not completed prior to the end of the interval, are stored for subsequent access and use. Ideally, by having these results precomputed and ready for future use, future response time, i.e. run-time delay, is appreciably shortened since that task instance, when it would otherwise be dispatched for execution, will have already executed—fully or at least partially. In this manner, available computer resources, here processing time, are maintained at relatively high usage during all time periods, rather than experiencing bursty usage patterns as conventionally occurs; hence, significantly enhancing overall system throughput.

In that regard, consider task chart 7, depicted in FIG. 1, which shows task execution that could illustratively occur in accordance with the principles of the present invention to utilize idle-time intervals, such as those shown in diagram 3. Rather than merely waiting during each idle-time interval, the operating system, during the onset of that period, probabilistically analyzes future task instances, in accordance with my present invention, to select a given task for precomputation. That instance is then processed to the extent of the available time remaining during that interval. For example, assume at the onset of idle-time interval $10_1$, a group of four unexecuted task instances $I_1$, $I_2$, $I_3$ and $I_4$ is likely to be invoked at some point in the near future. These tasks, viewed collectively, could be a portion of one or more application programs then executing, such as, e.g., a file save task, a file read task, a file download task, a format task or a spreadsheet rotate task.

Particularly in a personal computer processing environment, application based tasks are highly user dependent, in that each such task instance has an associated probability (likelihood) of then being invoked by the user. For any such task instance, this probability accounts for a user not invoking that task at all and if the task is to be invoked, when, relative to a current time, that task is to be invoked. Those task instances with a higher probability are more likely to be invoked sooner than those tasks with a lower probability. Here, illustrative task instances $I_1$, $I_2$, $I_3$ and $I_4$ correspondingly carry, as symbolized by lines 22, 24, 26 and 28 corresponding probabilities $p_1$, $p_2$, $p_3$ and $p_4$ of future execution. Ignore for the moment just how these probabilities are determined; that will be shortly addressed below through three different scenarios. For the four available task instances and at the onset of idle-time interval $t_1$, operation 20 compares the corresponding four probability measures and selects that task instance, here $I_2$, then having the highest probability, $p_2$, of future execution. Once this task is selected, the operating system then executes this task, as symbolized by block 30, throughout the remainder of this idle-time interval.

Contrary to well-established principles of time-sharing, I have recognized that enhanced performance and throughput results if the selected task is executed to the fullest extent of the available time during this idle-time interval rather than being prematurely terminated in favor of another task. In that regard, I have found that use of a conventional time-sharing approach, under which an equal amount of time is allocated to each task instance in a group, would result in a sub-optimal allocation of available processing time.

Should idle-time interval $t_1$ elapse prior to completion of task instance $I_2$, this instance then halts, with partial results stored in memory, in favor of task instances A being executed, as symbolized by block 35, during the following high activity period, i.e. pulse $10_2$. Similarly, at the onset of the next idle-time interval $t_3$, the operating system will select, as symbolized by operation 40, a task instance, from those future task instances then available, which has the highest probability associated therewith, here illustratively task instance $I_7$ from a group then consisting of illustratively task instances $I_5$, $I_6$, $I_7$ and $I_8$ carrying associated probability measures $p_5$, $p_6$, $p_7$ and $p_8$, as symbolized by lines 42, 44, 46 and 48, respectively. Task instance $I_7$ then executes, as symbolized by block 50, to the extent of the available time remaining during idle-time interval $t_3$. Based on the probabilities of all future task instances, the task instance, here interval $I_7$, that is executed during an idle-time interval may not necessarily be the task instance, e.g. instance $I_2$, that was only partially executed during the most recent idle-time interval. Immediately thereafter during high activity period, $t_4$ (pulse $10_4$), task instances B execute, as symbolized by block 60.

If, however, sufficient time remains during any such idle-time interval, then another probabilistic based assessment is made to select a future task instance among those then available for precomputation and that particular task instance is executed to the extent of the remaining time, and so forth until that interval elapses. In that regard, at the onset of idle-time interval $t_5$, operation 70 assesses probability measures, $p_9$, $p_{10}$ and $p_{11}$ carried, as represented by lines 72, 74 and 76, by a group of future task instances $I_9$, $I_{10}$ and $I_{11}$, respectively. The task instance in this group then having the highest measure, here illustratively task instance $I_{10}$, then executes, as symbolized by block 80. Since this task instance completes prior to the end of idle-time interval $t_5$, probability measures of a group of future task instances, then available for precomputation, here containing task instances $I_{12}$ and $I_{13}$, are assessed, as symbolized by operation 90, with one of these tasks, here instance $I_{13}$, being selected. As symbolized by block 100, this instance then executes to the extent of the remaining time left in this idle-time interval. At the conclusion of idle-time interval $t_6$, task instances C execute during ensuing high activity period $t_6$ (pulse $10_6$), as symbolized by block 110, and so forth.

As noted above, three distinct scenarios (characteristics) can arise for selecting task instances for precomputation: those future task instances that exhibit constant value over time, those future task instances that exhibit time-varying value, and those future task instances that exhibit higher present (expected) value than does a currently executing task instance. While the first two scenarios are directed to optimal use of idle-time and other processing periods of relatively low activity, the third scenario can arise and dictate optimal use of processing time during any period, regardless of whether it is low or high activity. Though individually any task instance within a group of future task instances can exhibit any of these three value-based characteristics, for simplicity, I will separately address each of these characteristics and the decisional analysis used to select a future task instance from among a group of such instances having the same characteristic. Inasmuch as those skilled in the art will surely realize that the analysis, regardless of the modality used, reduces to a probability-based measure, these different modalities, depending upon the characteristics of the tasks in a given group, can be combined as needed during the onset of any idle-time interval to select an appropriate task instance, presently executing or future, from amongst those in the group, for current or continued execution, respectively.

1. Task Instances Exhibiting Constant Value Over Time

Some task instances possess a fixed value (utility) that does not vary with time. The value may be known quantitatively or at least qualitatively. For example, in a database application, a file save operation takes precedence over exiting the database program or even changing a existing entry or creating a new record if the database is open; the simple reason being to preserve the current data then resident in the database. Other tasks, such as changing a background color of a display, would clearly be of much lesser importance. As such, certain tasks can be ranked in terms of their future importance, which may include, e.g., their fixed value, future costs associated therewith, such as for delayed future availability of results from those tasks, or at least qualitative importance to a user. Task instances that possess a higher future importance, e.g., value, quantitatively or qualitatively, would simply be ranked ahead of those exhibiting lesser importance.

In accordance with my specific inventive teachings, given a group of future task instances available at the onset of an idle-time interval wherein each of these instances possesses either a fixed value or qualitative ranking in terms of its importance vis-à-vis other such task instances, the task instance that then possesses the highest value or importance (quantitatively or qualitatively) would be selected and executed first during that interval—that instance is the one then providing the highest current utility. That instance would then be removed from further consideration. The remaining future task instances in a group would be re-evaluated at the onset of each successive idle-time interval to select the next task instance, from the group as it then exists, which would then be most appropriate for precomputation. Should additional time remain during any such interval, then the future task instances then existing would re-evaluated for possible precomputation during the remainder of that interval. Should the ranking reveal two (or more) task instances that then possess the same highest equal value or importance, then any of these particular task instances could be selected, on an indifferent basis, for precomputation during an associated idle-time interval and, once selected, would be precomputed to the extent of the time available during that interval.

Specifically, expected delay at run-time associated with, e.g., precomputing a task instance is a function of the actions the system takes to precompute answers to challenges faced by that instance and the duration of an idle-time interval during which such precomputation is to occur. Here, a goal is to minimize run-time delay.

Time parameter, $t(I_i)$, represents time required to completely solve task instance $I_i$. Parameter T represents total time available during an idle-time interval with $t_i^f$ representing a fraction of available idle-time allocated to precomputing instance $I_i$ ahead of time. The total usable idle time T is less than or equal to the maximal idle time, $T_m$, during any one idle-time interval and sufficient to execute all potential future task instances, which is given by equation (1) as follows:

$$T_m = \sum_i t(I_i). \tag{1}$$

With these terms defined as such, the expected run-time delay before completing execution of a future task instance is given by expression (2) as follows:

$$\sum_j p(T_j) \sum_i p(I_i \mid E)\left[t(I_i) - T_j t_i^f\right] \tag{2}$$

where:

$$T_j t_i^f \leq t(I_i),$$

and

E represents observed evidence, i.e., for example, the current status of: task instances, the processing and application environments, and other pertinent characteristics.

Expected savings gained from idle-time computation can be viewed as set forth in expression (3):

$$\sum_j p(T_j) \sum_i p(I_i \mid E)\left[T_j t_i^f\right]. \tag{3}$$

For the next period of constant idle-time, T, the expected savings can be expressed in expression (4) as:

$$T \sum_i p(I_i \mid E) t_i^f. \tag{4}$$

Hence, these savings will be optimized by maximizing the quantity $$\sum_i p(I_i \mid E).$$

Hence, from this, given an ordering of future task instances with conditional probabilities, $p(I_1|E) > p(I_2|E) > \ldots p(I_n|E)$, representing the likelihood that the corresponding instance will be executed during the next idle-time interval, the idle-time fraction that minimizes expected computation time, i.e. run-time delay, in that next period is to apply available computation time to the most likely future task instance until it is completely solved, then the next most likely and so on until the cessation of the available idle-time or all potential future task instances have been executed in that period, whichever comes first. Moreover, if two or more of these future task instances possess equally valued likelihoods, the expected computation time in the next period, i.e. run-time delay, is minimized by partitioning resources, here available processing time, in that period to the equally likely instances in any configuration of fractions. Hence, for all such equally likely task instances, any one of them can be selected, on an indifferent basis, for computation during that interval without adverse effect on expected run-time savings.

As one can now appreciate and generally speaking, application response time, in terms of expected run-time delay, can be advantageously reduced by selecting the task instance (s), that has the highest importance, in terms of its likelihood of occurrence, for precomputation during an idle-time interval.

In many settings, the cost of waiting for a computational result depends on context-dependent time criticality. Let me generalize the results on minimizing expected delay to minimizing an expected cost of delay. The generalization is based on an analysis similar to the one used herein to identify policies for minimizing delay. Assume that each future problem instance has a time-dependent cost function, Cost $(I_i,t)$, that takes as arguments, an instance and the time delay required to compute that instance following a challenge. Beyond specifying time criticality as a function of the instance, a distinct context variable can be employed. Without precomputation, the expected cost of waiting for a response to a next successive challenge is:

$$\sum_i p(I_i \mid E) Cost[I_i, t(I_i)]. \tag{5}$$

The contribution to the overall expected cost of the delay required to solve each future instance $I_i$ is p $(I_i)$Cost$(I_i,t(I_i))$. Idle time T≦t $(I_i)$ applied to precomputing instance $I_i$ will reduce the expected cost of delay by $p(I_i)$[Cost$(I_i,t(I_i))$−Cost $(I_i,t(I_i))$−T].

The total usable idle time is allocated in such a way that minimizes expected cost. To identify an ideal continual-computation policy for the general case of Nonlinear cost functions, search, or greedy analysis with small amounts of resource, can be employed. However, general strategies can be constructed for specific classes of cost functions. For example, consider the case where costs increase linearly with delay, Cost$(I_i,t)$=$C_i$t, where $C_i$ defines a rate at which cost is incurred for each instance $I_i$. The component of comprehensive expected cost contributed by the expected delay solving each instance $I_i$, is $p(I_i)C_i t(I_i)$. Allocating idle time to precompute an instance diminishes the expected cost or increases the expected value at a constant rate of $p(I_i)C_i$. The expected value in a next successive period is maximized by allocating idle time to commence solving the instance associated with the greatest expected rate of cost diminishment, $p(I_i|E)C_i$, and to continue until that instance is solved, and then to solve an instance with the next highest expected rate, and so on, until all of the instances have been solved. Resources can be allocated indifferently to problems with the same expected rate of diminishment of cost. In the next section, I will delve further into the use of rates of refinement in identifying continual computation policies for flexible strategies.

2. Task Instances Exhibiting Time-varying Value

Other tasks produce value that varies with time. For example, as a task instance generates additional, though partial, results, the value of those results may well increase as additional results are generated while that instance continues to execute until a final, precise result is ultimately produced. Such a task instance is typified by web page downloading. As additional information is downloaded and increasingly large amounts of a single web page are displayed to a user until, e.g. a page with a fully rendered graphic is displayed, the value of the results, i.e. the entire page being displayed as it builds, increases. Another class of time-varying value producing tasks is sorting operations. As a sorting operation progresses, an increasingly large portion of an input data list is sorted and hence presents increasing value over time to a user, until the entire list has been sorted, at which point maximal value occurs.

In analyzing future task instances with time-varying value and selecting one from amongst a group of such tasks for precomputation, my present invention relies on characterizing such instances in terms of their expected value of computation (EVC) and flexibly selecting such an instance that presents an optimal, i.e. maximized, EVC rather than just minimizing delay at run-time. I utilize EVC based on my recognition that the value of partial results provided by continued computation will change with time. EVC is the value of refinement of a result with increased computation. Many tasks, particularly application invoked task instances that execute in a personal computer environment, are highly user dependent and hence can not be guaranteed to occur at any one time. Hence, the computational results of such task instances must account for uncertainty of their execution. Therefore, given a computer system that employs a flexible computation strategy, S, to select a task instance, I, for execution or to refine a partial result, $\pi(I)$, stemming from a prior computation, i.e. $\pi'(I)$, (the partial result being a transformed task instance I'), this strategy can be framed, using conditional probabilities, as depicted in equation (6):

$$S[\pi(I), t] \rightarrow p[\pi'(I)|\pi(I), S, t] \tag{6}$$

with EVC being given by equation (7) as follows:

$$EVC[S_i, \pi(I), t] = \sum_j p[\pi'_j(I) \mid \pi(I), S_i, t] u_o(\pi'_j(I)) - u_o(\pi(I)) \tag{7}$$

where: $u_o(\pi(I))$ is an object-level value (utility) of a previously computed result ($\pi(I)$). Where cost is deterministic and separable from the value of computation, net EVC (NEVC) can be given by equation (8) as:

$$NEVC[S_i, \pi(I), t] = EVC[S_i, \pi(I), t] - C(t) \tag{8}$$

where: C(t) represents cost of the computation.

To maximize NEVC, first assume that the selection of computation strategy S is predefined or optimized with S* referring to such an optimized strategy. Since costs of processing one task instance as against another during any one idle-time interval are not likely to differ between these instances, then NEVC will be maximized coincident with maximizing EVC. Given this, maximal EVC for a next successive idle-time interval occurs when resource fraction $t_i^f$ is selected to optimize an expected value of precomputation (EVP), i.e. EVC but for a future task instance. The value of allocating resources to precomputing future task instances in a computer system that relies on a flexible computation strategy, S, can be characterized in terms of a rate at which the best strategies can deliver value with continuing computation. In that regard, I utilize the term "EVC flux" (also denoted as ϕ) to refer to a rate of change in value with computation time. The EVC flux, ϕ(S,I,t), for a given strategy S used in conjunction with a given task instance I, denotes an instantaneous time rate of change, i.e. the derivative dEVC/dt, at which this strategy delivers value at t seconds into the execution of that instance.

Figures 2A, 2B:
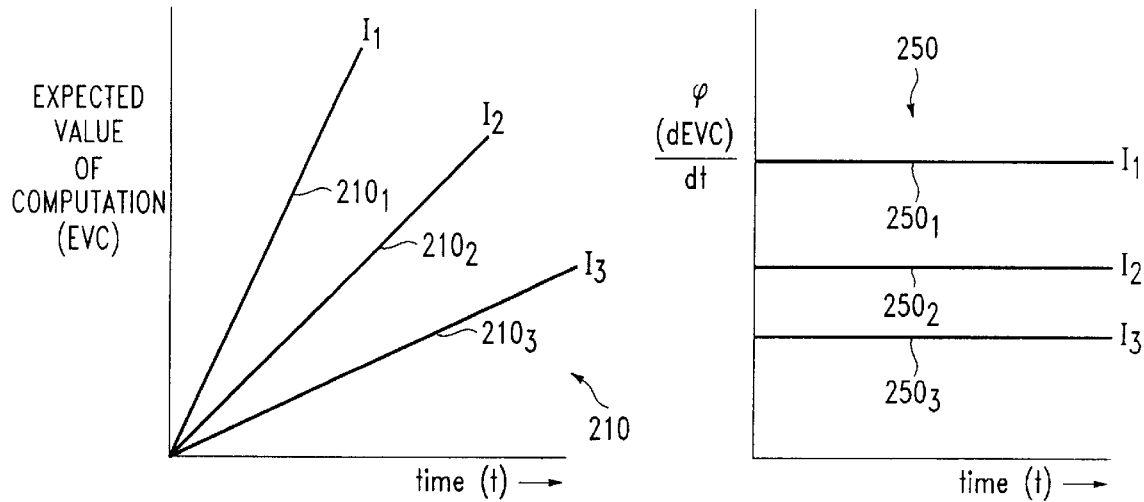
FIG. 2A graphically depicts illustrative linearly-increasing expected value of computation (EVC) curves 210 for three different task instances.
FIG. 2B graphically depicts EVC flux, i.e. instantaneous time rate of change in EVC (dEVC/dt), curves 250 associated with curves 210 shown in FIG. 2A.

At this point, consider FIGS. 2A and 2B. The former figure graphically depicts illustrative linear EVC curves 210, specifically lines $210_1$, $210_2$ and $210_3$, for three different task instances, $I_1$, $I_2$ and $I_3$, respectively, over time. As can be seen, each of these instances generates expected value that linearly increases with continued computation time, t, shown as $EVC(I_1) > EVC(I_2) > EVC(I_3)$. Given the linear nature of the EVC for these instances, the corresponding EVC flux values over the same time, t, are constant as shown by lines 250, specifically lines $250_1$, $250_2$ and $250_3$, depicted in FIG. 2B.

a. Linearly Varying EVC

In accordance with my specific inventive teachings, I have determined that, for task instances that exhibit constant valued EVC flux over time, the computational strategy that maximizes EVC, at the start of a next idle-time interval, is to apply available resources, here computational time available during that interval, is to select the task instance that possesses the largest product of its probability and EVC flux—the product being a measure of incremental utility of the task instance. This task instance should be processed until a final result is produced, then the future task instance possessing the next highest product should be selected and so on, until either the available idle-time in this period expires or all potential future task instances have been precomputed to completion. Similarly to that discussed above for fixed task value (or importance), if two or more of these likely task instances exhibit equal probability-flux products, then the expected computation time in the next period, i.e. run-time delay, is minimized by partitioning resources, here available processing time, in that period to the equally likely task instances in any configuration of fractions. Hence, if all such equally likely task instances possess equally valued products, then any one of them can be selected, on an indifferent basis, for precomputation during that interval without adverse effect on expected run-time savings.

b. Non-linearly Varying EVC

Figures 3A, 3B:
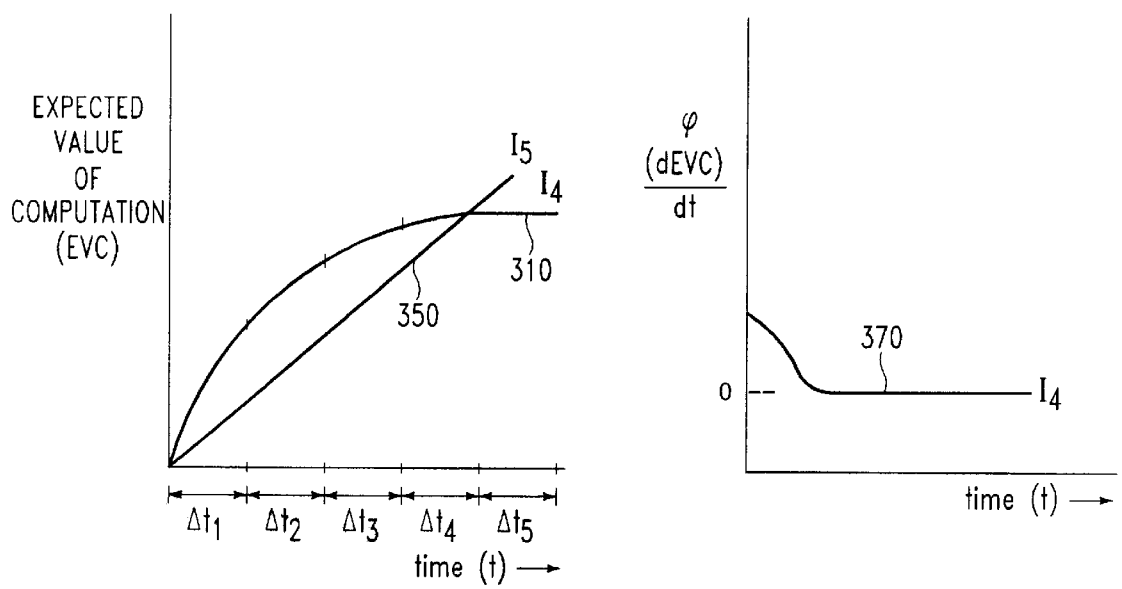
FIG. 3A graphically depicts non-linear EVC curve 310 for an illustrative task instance, along with, for purposes of comparison, constant EVC curve 350 for another task instance.
FIG. 3B graphically depicts approximate EVC flux curve 370 associated with curve 310 shown in FIG. 3A.

Task instances can also exhibit non-linear changes in EVC over time. Such changes can be either positive or negative, in that the EVC of an instance expands or contracts on a non-linear basis with continued computation. For example, FIG. 3A graphically depicts non-linear EVC curve 310 for illustrative task instance $I_4$, along with, for purposes of comparison, constant EVC curve 350 for another task, $I_5$. As can be seen, the EVC for task $I_4$ exhibits non-linear increases at small time periods, then flattens with increasing time. EVC flux curve 370, associated with curve 310, is depicted in FIG. 3B.

Generally, with non-linear EVC, I have recognized, in accordance with the present invention, that valid highly optimal, though somewhat approximate, allocation strategies can be found through myopic analysis of each idle-time interval to specify the task instance which then provides the largest incremental utility. Specifically, to do so, an idle-time interval is first parsed into successive relatively narrow pre-defined time slices, $\Delta t$. A contribution to EVP, i.e. $\Delta EVP(I_i)$, is determined for each time slice and for each future task then capable of being precomputed. This determination is made under a supposition of allocating $\Delta t$ worth of resources, here processing time, to precomputing each such future task instance during that time slice, as generally given by equation (9):

$$\Delta EVP(I_i) = p(I_i|E) EVC(S^*, \pi(I_i), \Delta t) \qquad (9)$$

The task instance which maximizes the incremental utility, i.e., for example the product of the probability and the EVC over this time slice, is selected to be precomputed and is allocated all available time during that slice. This process is repeated for each successive time slice during the idle-time interval with potentially differing task instances being selected for successive different slices, during a common idle-time interval, based on the optimization of equation (9) for each such slice. Here too, if the optimization yields, for any time slice, two or more task instances with equally valued products, then any one of these instances can be selected, on an indifferent basis, for computation during that time slice without adverse effect on expected run-time savings.

This time-slice approximation is based on assuming the EVC flux is approximately constant within any time slice. Hence, the accuracy of this approach increases as smaller time slices are used. With reference to FIG. 3A, if an idle-time interval were to be parsed into illustratively five equal time slices, each $\Delta t$ in length, hence forming slices $\Delta t_1$, $\Delta t_2$, $\Delta t_3$, $\Delta t_4$ and $\Delta t_5$, then equation (9) would be evaluated at the beginning of each of these five intervals.

For computational efficiency, a conventional "Greedy" type analysis is used to optimize equation (9) for each successive time slice in an idle-time interval. Inasmuch as "Greedy" type analyses are well-known, then, for the sake of brevity, I will omit all further details of this analysis and refer the reader, for these details, to Chapter 4, pages 152–197 entitled "The Greedy Method" of E. Horowitz et al, *Fundamentals of Computer Algorithms* (© 1978, Computer Science Press), which is incorporated by reference herein.

As one can now appreciate and generally speaking, for those tasks that present time-varying value, application response time and overall system throughput can be enhanced by selecting, from amongst future tasks then available for precomputation:

(a) for future tasks that each exhibit linearly varying value with time, that task instance which would provide a maximum incremental utility measure, i.e., here which maximizes, for an idle-time interval, the product of the probability associated with that task and its EVC flux during that interval; and (b) for future tasks that exhibit non-linearly varying value, that task instance which would provide a maximum incremental utility measure, i.e., here which maximizes, during each time slice within an idle-time interval, the product of the probability associated with that task and its EVC flux during each such slice.

Moreover, costs may arise in computational systems based on the overhead of shifting attention from one problem to the next. Such costs can influence decisions about shifting to problems with greater EVC flux. Given the presence of costs of shifting attention, idle-time should be switched to refining an instance that yields a greater expected EVC flux only if the expected benefits of the switch are greater than the costs of the shift. To compute the expected net gain in shifting attention, one needs to consider the probability distribution over remaining idle time, $t^r$, given idle time that has already been expended, $t^e$. Using $EVC_i(t)$, as shorthand for $EVC(S, I_i, t)$ and $Cost^s$ as the cost of shifting attention, the expected value of shifting to the new instance is:

$$\int_{t^r} p(t^r | t^e)[EVC_2(t^r)p(I_2) - EVC_1(t^r)p(I_1)] dt^r - Cost^s. \qquad (10)$$

As an example, consider the refinement of partial results for instances that are each represented by a concave-down piecewise linear EVC function. Idle time is selected and applied to solve the linear segment of the instance associated with the largest expected EVC flux. However, when a segment is reached with a diminished flux, the value of continuing to refine the current instance versus moving to another instance with a greater expected flux must be re-examined. Assume that the expected EVC flux for a next leg of refinement for the current instance, $p(I_1)$, is less than the expected EVC flux for another instance $p(I_2)$, that is, $p(I_1)C_1 < p(I_2)C_2$. The expected value of shifting to the new instance is:

$$\int_{t^r} p(t^r \mid t^e) t^r [C_2 p(I_2) - C_1 p(I_1)] dt^r - Cost^s. \quad (11)$$

As specified in equation (12) below it will only be worth shifting if mean remaining idle time, $\bar{t}^r$, is greater than a ratio of the cost of shifting attention and a difference of the expected rates:

$$\bar{t}^r > \frac{Cost^s}{C_2 p(I_2) - C_1 p(I_1)}. \quad (12)$$

3. Future Task Instances(s) that Exhibit Greater Present Value than does a Currently Executing Task I have recognized that in certain situations, a future task instance(s), if precomputed, could provide greater expected value than the value provided by a task which is currently executing. In that regard, a portion of current task execution could be intentionally degraded or that task instance completely suspended, hence retarding or even halting execution of that task and freeing processing capacity, in favor of allocating that capacity to such a future task instance. Considering the net present value of results to be delivered by precomputing a future task instance necessitates time-discounting the net expected value of these results to the present. The discounted net expected value is then compared to losses in current value that would result from reducing or prematurely suspending the refinement of a current task instance. If the discounted value for any such future task instance(s) exceeds these losses, then a portion of present processing capacity is diverted from the presently executing task in favor of precomputing the future task instance(s).

An immediate loss of dedicating current resources, such as processing time, over a period of time is the product of that resource and average EVC flux over that period. The gains of allocating these resources to a future task instance is a function of the total amount of idle-time that will be presently available after a current task is degraded or prematurely suspended. If this idle time is sufficient, in duration, to fully process not only the present task instance but also all possible future task instances, then essentially nothing can be gained by transferring current resources to precomputing any future task instance. Hence, the expected value needs to be modified by a probability distribution, in terms of duration, taken over the available idle time.

Inasmuch as task instances, whether present or future, can exhibit either a linear or non-linearly varying EVC with time, discounted net present value of each one of all possible future tasks is determined at the onset of each pre-defined time slice, again referred to as $\Delta t$, of a current processing interval—regardless of whether that interval is marked by idle-time or high processing activity. The gain in transferring current processing time to precomputing a future task instance is determined by weighting the duration of available idle time by the probability distribution over that time.

a. Linearly Varying EVC

The future task instances ($I_i$) that exhibit a linear time-varying EVC are rank ordered in terms of, for each such task, the product of its EVC flux, $\phi_i$, and its associated conditional probability of occurrence, $p(I_i|E)$.

In computing the value of precomputation (EVP) achievable through a slice of current processing time, the uncertainty about the EVC flux that will be achieved through use of that processing time must be considered particularly since that uncertainty will depend upon the future task instance to which that time will be allocated. Moreover, the EVC flux generated by this time-slice depends on the total usable idle time, T, and an amount of time thereof that has already been re-allocated to future computation, $t_a$.

Hence, the current value of transferring a slice, $\Delta t$, of current processing time to precomputation, i.e. discounted EVC, is given, across all future tasks ($I_i$ for $i=1, \ldots, n$), by expression (13) as follows:

$$d \left[ \sum_{T=0}^{t(I_1)-t_a} p(T) \varphi_1 \Delta t p(I_1 \mid E) + \sum_{T=t(I_1)-t_a}^{t(I_1)+t(I_2)-t_a} p(T) \varphi_2 \Delta t p(I_2 \mid E) + \right.$$
$$\left. \cdots + \sum_{T=\sum_{i=1}^{n-1} t(I_i)-t_a}^{\sum_{i=1}^{n} t(I_i)-t_a} p(T) \varphi_n \Delta t p(I_n \mid E) \right] \quad (13)$$

where: d is a constant positive time-discount factor $(0 < d \leq 1)$.

As one can appreciate, as the amount of total time allocated to a particular task instance increases so that $t_a \geq t(I_i)$, the future task instance, $I_i$, (and its associated term) is removed from the expression, as that instance will have been completely processed through precomputation. Though the time-discount factor is illustratively a constant applied across all future task instances, this factor can also be applied to each individual future task instance and can vary linearly or non-linearly with time, as appropriate, to accurately reflect diminution to the present of net expected value, to be provided in the future, by that individual future task instance.

Hence, in accordance with my inventive teachings, I conclude that current resources, such as processing time, should not be allocated to a future task if the EVC flux provided by the currently executing task instance exceeds the largest incremental utility measure of that future task instance, i.e., for example, the largest product of the probability of a future task instance and the EVC flux of that future task instance. Therefore, if for any time slice, the EVC flux for the currently executing task instance exceeds a largest incremental utility measure (i.e., the product of the EVC flux and the probability of the future task instance), then the affect on this product of discounting as well as the probability associated with idle time are both irrelevant and need not be considered, inasmuch as precomputation would be inferior to continuing the task instance that is currently executing during this slice. Alternatively, if precomputation is warranted, i.e. the discounted product exceeds the EVC flux for the currently executing task instance, then execution of this current task instance is suspended (which here includes its termination or merely retarding its execution, as appropriate) and the future task instance having the largest product of probability and EVC flux is precomputed to the fullest extent possible.

b. Non-linearly Varying EVC

For future task instances having non-linearly varying EVC, the EVC flux of the presently executing task is compared to the discounted incremental utility measure, i.e., here discounted EVC flux-probability product, of the future tasks, with precomputation occurring only if the latter exceeds the former. This comparison could occur at either of two intervals: either at regular time slices, as described above, or, for each future task instance that is being precomputed, at the conclusion of that future task instance. In the latter situation, precomputation would continue only if the discounted EVC flux-probability product for the future task exceeded the EVC flux of the current task then suspended. As additional future task instances are encountered, their discounted EVC flux-probability products would be considered in an identical fashion. Likewise, as a future task instance is precomputed, its discounted EVC flux-probability product is removed from further consideration.

Whenever precomputation is to occur, then for computational efficiency, a conventional "Greedy" type analysis, as noted above, is then used to select the particular future task for precomputation, i.e. having the highest EVP, from amongst those then pending.

To enhance understanding of the concept of allocating resources to precompute a future task instance at the cost of prematurely suspending a presently executing task instance, the reader should now consider FIG. 4.

This figure graphically depicts illustrative non-linearly varying $\phi \times p$ curve 410 for a currently executing task instance and illustrative linearly varying discounted $\phi \times p$ curve 450 associated with a future task instance pending for precomputation. Initially, assume that the task instance represented by curve 410 is executing and continues to do so through time slice $\Delta t_1$. At the end of this slice, curve 410 has an illustrative magnitude $l_1$ which exceeds a magnitude then exhibited by future task instance curve 450. Consequently, the present task instance continues to execute. At the end of the next time slice, i.e. $\Delta t_2$, curve 410 still exhibits a greater magnitude, i.e. here $l_4$, then does curve 450. Hence, current processing resources, here processing time, continue to be allocated to the presently executing task instance to further its execution and achieve current value thereby. Inasmuch as curve 410 begins to exhibit a downwardly concave shape starting in time slice $\Delta t_3$ and continuing into time slice $\Delta t_4$, the current task instance yields increasingly less incremental current value relative to that which can be had, discounted to the present, through precomputing the future task instance. Inasmuch as the incremental value provided by the currently executing task instance at the onset of each of time slices $\Delta t_3$ and $\Delta t_4$, i.e. magnitudes $l_4$ and $l_3$, respectively, still exceeds the EVC provided, on a discounted basis, by the future task instance at those times, processing resources continue to be allocated to the former task instance for the remainder of each of these intervals. However, at the onset of the next time slice, i.e. $\Delta t_5$, the discounted EVC provided by the future task instance now exceeds the incremental value provided by current task instance, i.e. magnitude $l_1$. Consequently, since the future task instance will provide greater EVC, discounted to the present, processing resources, here processing time, are allocated to the former rather than the latter instance. Hence, the currently executing task instance is terminated in favor of precomputing the future task instance. Inasmuch as the discounted EVC provided through precomputation of the future task instance will continue, though time slice $\Delta t_6$ to exceed the EVC of the current task instance (now suspended), precomputation of the future task instance will continue through this time slice as well. A similar graphical analysis can be made between any presently executing task instance and a future task(s) instance to determine whether precomputation of the latter should occur and when.

C. Hardware Aspects of Present Invention

Figure 5:
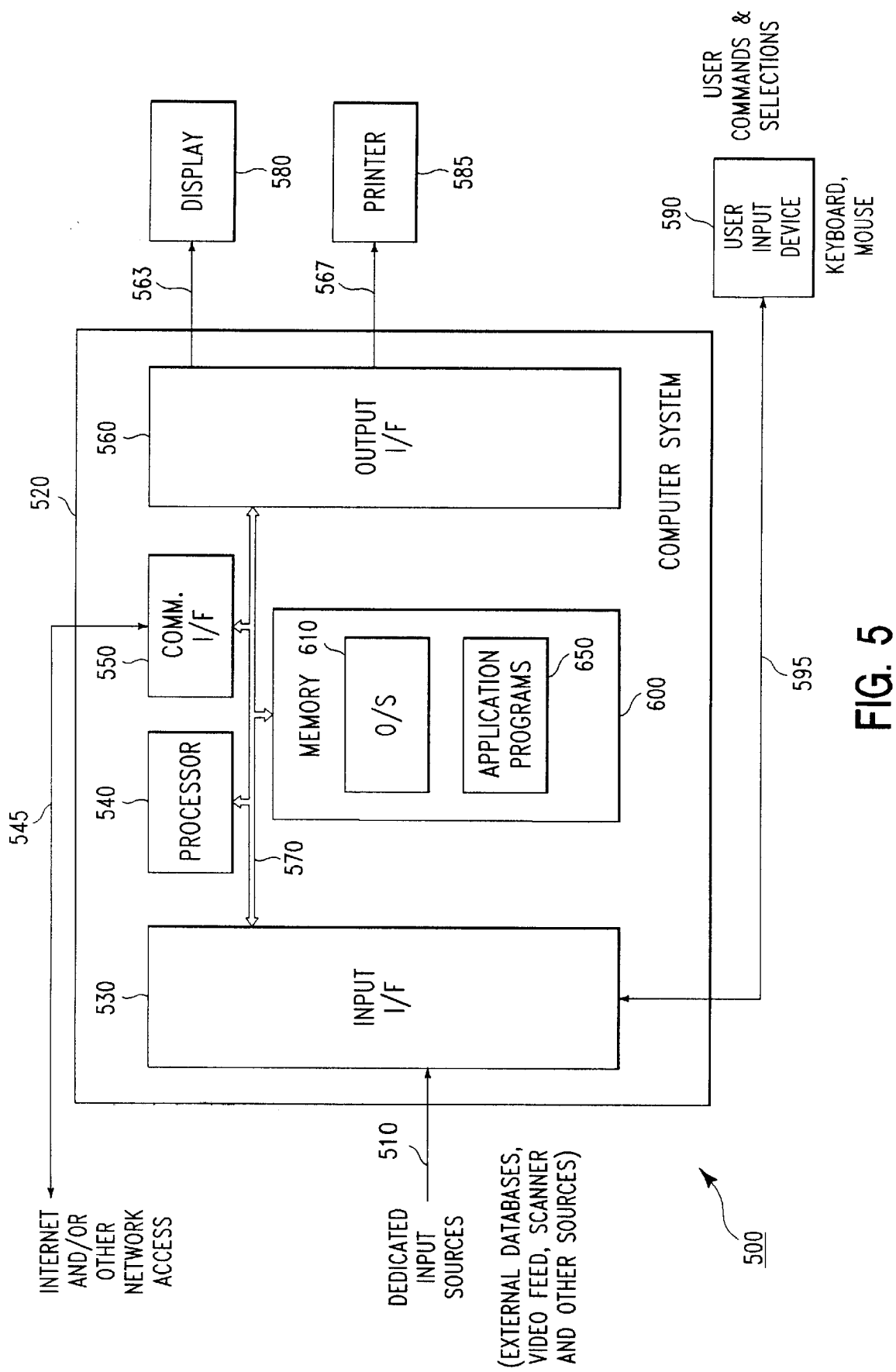
FIG. 5 depicts a high-level block diagram of system 500 that implements the present invention.

FIG. 5 depicts a high-level block diagram of system 500, typically a personal computer, that implements the present invention. As shown, this system contains computer system 520 which itself comprises input interfaces (I/F) 530, processor 540, communications interface 550, memory 600 and output interfaces 560, all conventionally interconnected by bus 570. Memory 600, which generally includes different modalities (all of which are not specifically shown for simplicity), illustratively random access memory (RAM) and hard disk storage, stores operating system (O/S) 610 and application programs 650. Where my invention is used, as described above, for application independent task selection for precomputation during idle or other processing times, the specific software modules that implement my inventive teachings would be incorporated within O/S 610 along with accompanying data (specifically task "value" specifications) contained within each of application programs 650 (all as discussed below in conjunction with FIG. 6). O/S 610 itself, apart from these modules, may be implemented by any conventional operating system, such as the WINDOWS NT operating system. Given that, I will not discuss any components of O/S 610 other than those needed to specifically implement my invention, as the rest are irrelevant.

As shown in FIG. 5, incoming information can arise from two illustrative external sources: network supplied information, e.g. from the Internet and/or other networked facility, through network connection 545 to communications interface 550, or from a dedicated input source via path(es) 510 to input interfaces 530. Dedicated input can originate from a wide variety of sources, e.g., an external database, video feed, scanner or other input source. Input interfaces 530 are connected to path(es) 510 and contain appropriate circuitry to provide the necessary and corresponding electrical connections required to physically connect and interface each differing dedicated source of input information to computer system 520. Under control of the operating system, application programs 650 exchange commands and data with the external sources, via network connection 545 or path(es) 510, to transmit and receive information typically requested by a user during program execution.

Input interfaces 530 also electrically connect and interface user input device 590, such as a keyboard and mouse, to computer system 520. Display 580, such as a conventional color monitor, and printer 585, such as a conventional laser printer, are connected, via leads 563 and 567, respectively, to output interfaces 560. The output interfaces provide requisite circuitry to electrically connect and interface the display and printer to the computer system. As one can appreciate, the particular type of input and output information and a specific modality through which that information is applied to or produced by system 520 are both immaterial for purposes of the present invention and thus will also not be discussed in any detail hereinafter.

In operation, typically one or more application programs 650 execute under control of O/S 610. Each of these programs is granularly implemented by a pre-defined collection of separate task instances. For each executing application program, one or more separate task instances are invoked by a user in response to each user specified command, typically entered interactively through appropriate manipulation of user input device 590 given available command choices, such as in a menu or icons in a toolbar, and accompanying information then presented on display 580. Hardcopy output information from an executing application is provided to the user through printer 585.

To obtain ordered execution of the invoked task instances, the associated application program specifies these instances, in order, to the O/S for eventual scheduling and ordered execution. My present invention, as described in detail thusfar, implemented within O/S 610 and employing task information data resident with applications programs 650, selects available future tasks required by, e.g., the current application programs, or by the O/S itself, for precomputation in order to optimally utilize resources provided by system 520, specifically processing time including but not limited to that occurring during idle-time intervals, to process these tasks and enhance application response and overall throughput.

Advantageously, my present invention, when embedded for general use within O/S 610, requires minimal and generally no user interaction and is thus substantially, if not totally, transparent to the user.

Furthermore, since the specific hardware components of computer system 520 as well as all aspects of the software stored within memory 600, apart from the modules and accompanying data that implement the present invention, are conventional and well-known, they will not be discussed in any further detail.

D. Software Aspects of Present Invention

Figure 6:
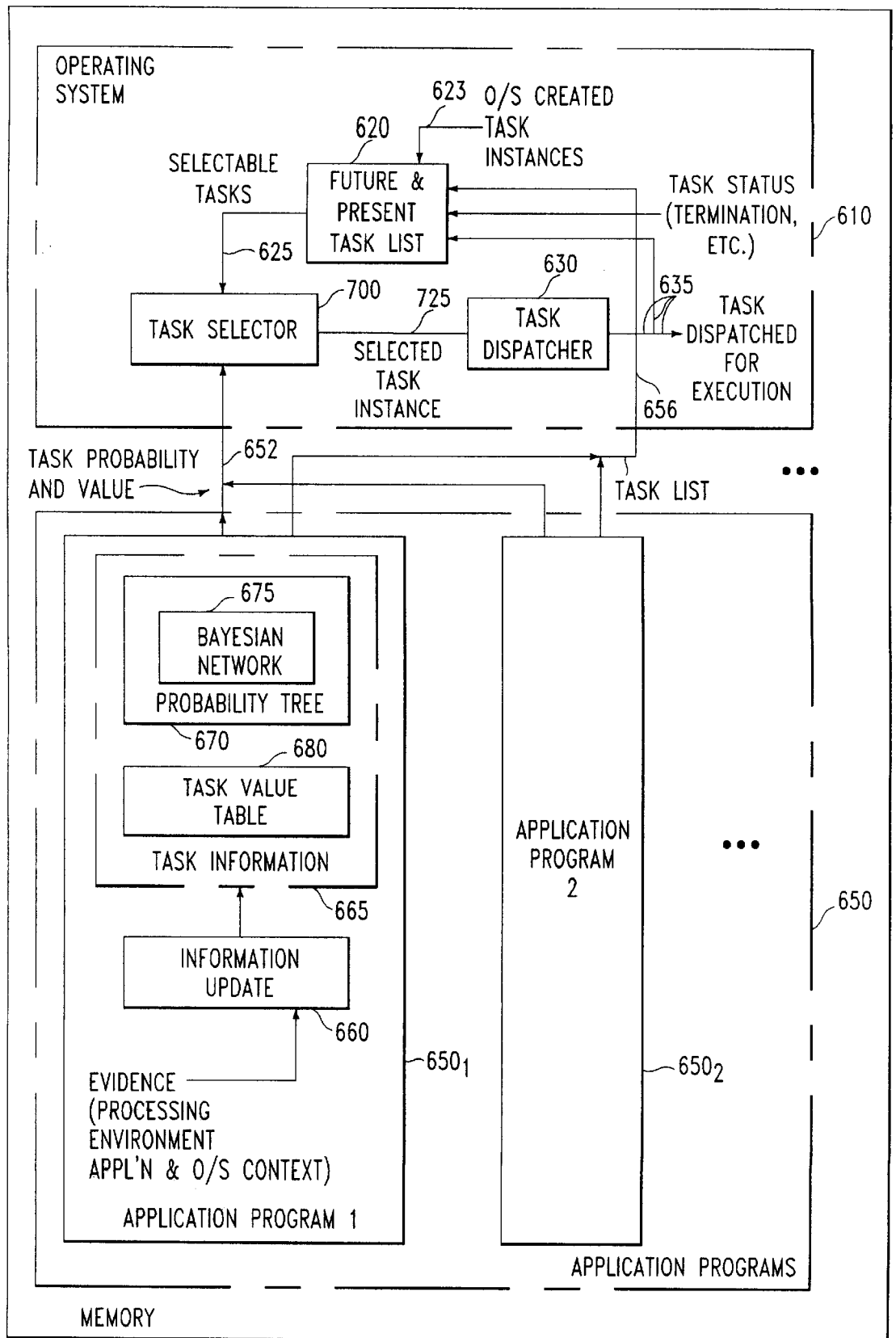
FIG. 6 depicts a high-level block diagram of those portions of operating system 610 and application programs 650 that execute within system 500 and collectively implement one embodiment of the present invention.

FIG. 6 depicts a high-level block diagram of those portions of operating system 610 and application programs 650 that execute within system 500 and collectively implement one embodiment of the present invention.

As shown, applications programs 650 contain individual application programs $650_1$, $650_2$, . . . (also denoted as application program 1, application program 2, . . . ). Each of these programs contains stored task information, such as information 665 for application program 1, and an information update function, such as update 660. Task information is formed of probability tree 670 and task value table 680. Tree 670 stores the probability (likelihood) of each separate task. As described above, each of these probabilities is conditional, i.e. it is typically conditioned on observed evidence. This evidence may vary from task to task, but in general includes the state of other tasks (if any) situated higher in the tree, the past context of the application and often of the operating system as well, and other salient environment parameters. Preferably, tree 670 can be computed through a Bayesian network. Generally speaking, such a network represents a joint-probability distribution for a set of variables, here the variables are task instances. Each possible task instance occupies a corresponding node in the network with a link between two such nodes signifying a joint probability therebetween. The hierarchical distribution of nodes represents corresponding layers of inter-dependency of the possible task instances. Those application task instances occupying higher levels of the network would be less dependent on other application task instances than those situated lower in the network. Inasmuch as Bayesian networks are very well-known in the art and the present invention does not include details of the internal organization of such a network, I will omit any further details of the network 675 itself—all of which will be clearly evident to those skilled in the art, and refer the reader to Chapters 2 and 3, pages 29–141 entitled "Bayesian Inference" and "Markov and Bayesian Networks: Two Graphical Representations of Probabilistic Knowledge", respectively, of J. Pearl, *Probabilistic Reasoning in Intelligent Systems—Networks of Plausible Inference*, Revised Second Printing (© 1988, Morgan Kaufmann Publishers, Inc.), which is incorporated by reference herein. In addition, for further information on Bayesian networks, though presented in the context of an automated user help facility, the reader is directed to co-pending United States patent application entitled "Intelligent User Assistance Facility", Ser. No. 08/684,003, filed Jul. 19, 1996 which is owned by the assignee hereof and is also incorporated by reference herein. The art teaches other mechanisms, such as Hidden-Markov models, for efficiently determining probability of state transitions, i.e. here successive task instances, which could be used in lieu of a Bayesian network.

Conventional computational procedures, referred to as Bayesian inference algorithms, operate on a Bayesian network, and in particular to update probability distributions over states of variables in the network given changes that are made in these states. An example of state changes include new values assigned to states of variables representing observable states of the world, following the observation of these states in the world. Consequently, such algorithms reside within block 660 and in response to the observed evidence update the individual probabilities, as needed, stored within network 675, as well as, if appropriate, within task value table 680. Furthermore, update block 660, in a conventional manner, contains suitable conventional procedures to modify the tree by adding and deleting task instances from the tree as needed, and specifying and/or modifying the probability inter-relationships among the tasks instances and their values then contained within the tree. Inasmuch as these procedures are also well-known, I will omit all further details thereof.

The probabilities are generally quantitative; however, as discussed above, any of them can be qualitative in terms of a priority classification, such as "high", "medium" or "low". If such a classification is initially assigned to a task instance, then, during application initialization, that classification is mapped to a predefined numeric value, which is subsequently stored within network 675. In addition, the probability for any task instance represented within the tree can be a stored function, which is calculated at run-time to yield a numeric value, or a look-up table (LUT), which is accessed and interpolated at run-time, to yield a corresponding numeric probability for that task instance.

For each task instance represented within Bayesian network 675, task value table 680 stores, in a separate entry, a measure of the value (i.e. utility, here $u_o(\pi(I))$) of that task instance relative to that of other such task instances for application $650_1$. For any given task instance, this accompanying value, as noted above, reflects an object-level value of a previously computed partial result of that instance. This value is initially defined by a programmer during program development. Update function 660 can modify this value, as needed, during application execution to reflect changes in task value over time. This value may be constant, i.e. exhibiting no variation with time, or time varying, the latter including linear or non-linear variation. This value may be represented by a function or a LUT correspondingly calculated or accessed and interpolated, if necessary, during run-time. In addition, since task value can be probabilistic in nature and conditioned on other tasks having executed and/or other environment parameters, all such values can be collectively represented by another Bayesian network, or one integrated with network 675 to form a single unified network. In the case of non-constant probabilities or task value measures, these probabilities and task values for a common application are all reset to corresponding default values during application initialization.

Operating system 610 contains task selector 700, task dispatcher 630, and future and present task list 620.

While each application program, such as application program 6501, initializes, that program loads, as symbolized by line 656, a list of task instances represented within the Bayesian network into future and present task list 620 into task selector 700. Accordingly, list 620 will contain a table of all possible future task instances taken across all executing applications. During application execution, list 620 specifies not only the currently executing task instances but also all possible future task instances for that application then available for precomputation. This list is dynamically changed by the operating system as task instances complete, and new task instances are created by any of the application programs. Inasmuch as operating system 610 also spawns new (e.g. application independent) task instances, the operating system, as symbolized by line 623, specifies these instances to list 620 in order to appropriately update this list. Since the portion(s) of the operating system which creates task instances are irrelevant to the present invention, all details thereof have been omitted from this discussion.

After an application program, such as application program $650_1$, has started executing, task selector 700 selects task instances for current execution at either of two times: (a) during idle-time, and (b) during any other time if the discounted EVC of a possible future task then available for precomputation exceeds the current value, i.e. EVC, of the task instance which is actively executing at that time.

As to task instance selection for idle-time execution, at the onset of each idle-time interval, task selector 700 determines which future task instance to precompute immediately thereafter during that interval. Selector 700 makes this determination by first querying the Bayesian network given the present context of the processing environment, to determine the future task instances that, given this context, can be precomputed at this instant of time. The available task instances are then evaluated by the task selector in the manner set forth above, depending upon whether those task instances possess constant value, or time varying value, the latter being either linear or time-varying. The value parameters for these task instances are accessed from task value table 680. If an associated task instance possesses a constant value, then a single value is merely accessed from an entry for that instance in table 680. Alternatively, if the value for this task instance is time-varying, then this access may involve accessing and interpolating a look-up table stored within this entry or accessing a function stored within this entry and calculating the value therefrom at run-time. Once the task instance probabilities are obtained, together with the corresponding values, if needed, selector 700 selects the task instance for precomputation, in accordance with the algorithms set forth in detail above.

After the selection is made, task selector 700 suitably notifies, as symbolized by line 725, task dispatcher 630 which, in turn, dispatches that selected task instance for current execution. Once execution of that instance commences, task dispatcher 630 suitably informs, as symbolized by line 635, future and present task list 620 to update the list to signify that particular task instance as currently executing such that that particular instance will not be considered for precomputation during the current idle-time interval. In selecting such a task, task selector 700, as discussed in detail below in conjunction with FIG. 7, selects that future task instance that exhibits the highest product of its EVC flux and its probability. If task selector 700 determines for non-idle time task selection, that the no precomputation should occur, then the currently executing task continues its execution.

Furthermore, a user, through the operating system, can designate, within certain bounds, the priority, i.e. processing response, of foreground applications relative to that of background applications. With this designation, the operating system can readily modify the task values for, e.g., those task instances that constitute foreground applications, by multiplying, at run time, those values by an appropriate factor, proportional to the user's designation, to reflect the user's overall prioritization of these applications relative to others. The modified measures, will then be used, in selecting, as described in detail above, those task instances for possible precomputation during idle and/or other processing times.

Figure 7:
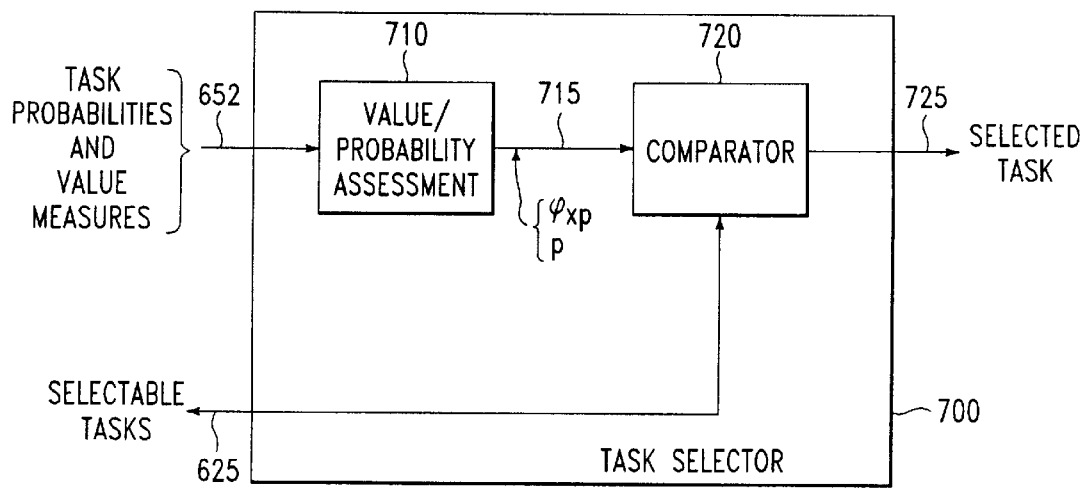
FIG. 7 depicts a block diagram of task selector 700 that forms part of operating system 610 shown in FIG. 6.

FIG. 7 depicts a block diagram of task selector 700 that forms part of operating system 610. As shown, selector 700 contains value/probability assessment 710 and comparator 720. As described above, during execution of an application program, probability and value measures for each task instance, both currently executing and those available for precomputation, for that application are provided, as symbolized by line 652, to task selector 700. For each such task, value/probability assessment 710 then, based on the scenario then occurring (i.e. idle-time precomputation with tasks possessing constant value, or tasks possessing time varying value—linear or non-linear; or precomputation during other processing intervals), generates an appropriate task selection metric for each such task instance. This metric can be task instance probability, or $\phi \times p$. Assessment block 710 also retrieves the current value of the task instance then executing, from task value table 680 (see FIG. 6) and determines its EVC flux for comparison against the quantified metric for each future task instance then available for precomputation. Thereafter, comparator 720 compares the quantified metrics against the value, i.e. EVC flux, of the currently executing task instance to identify the task instance, from those presently selectable—as symbolized by line 625 (see FIG. 6) then exhibiting the largest numeric metric. The identified task instance—either the present executing task instance or one of the available future task instances, is then sent, as symbolized by line 725 shown in FIG. 7 to be dispatched for current execution.

As discussed above, my invention will advantageously function within an O/S to select future task instances, for precomputation, independent of any program to which these instances are associated. Employed in this fashion, my invention advantageously requires substantially no user interaction and is thus substantially, if not totally, transparent to the user.

My invention can also be integrated into a specific application(s) to enhance, through precomputation of tasks specifically associated therewith, the execution and overall throughput of that application. This result is particularly advantageously through a wide variety of applications, such as, e.g., a computer based diagnostic system.

Figure 8:
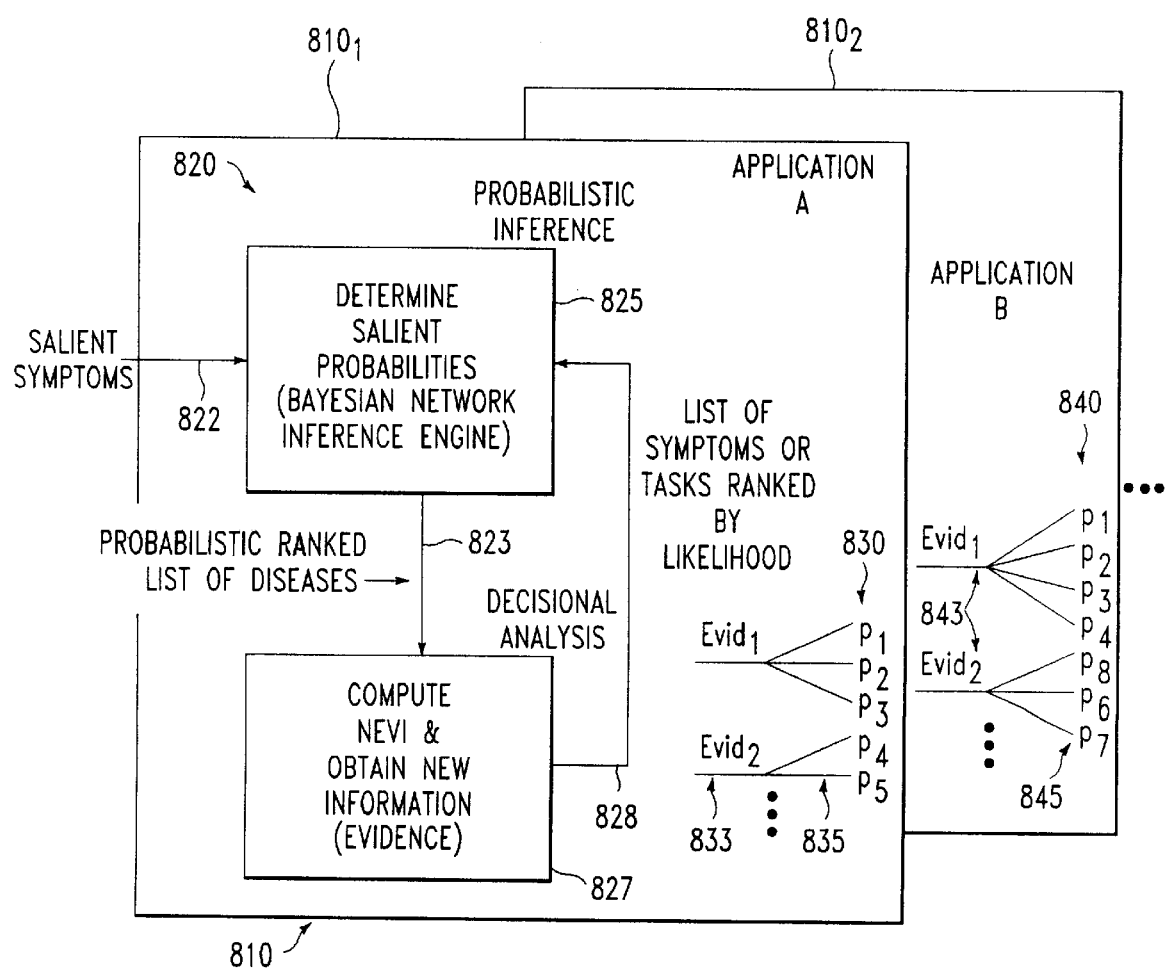
FIG. 8 depicts a high-level block diagram of another embodiment of my present invention, specifically probabilistic-based diagnostic system 820 for incorporation within a computer application.

In that regard, consider FIG. 8 which shows illustrative normative diagnostic system 820. In use, this system independently exists within and independently executes at run-time in each of a number of different applications 810, specifically $810_1$, $810_2$, . . . (also denoted as Application A, Application B, . . . ) to diagnose faults associated with that application.

System 820, employing the well-known concept of "sequential diagnosis", operates on the basis of probability and utility. Specifically, such a system, computes a probability of states of one or more system faults (e.g. diseases) from observations of evidence. The system provides a user with a probability distribution $p(H|E,e,\xi)$ over one or more variables of interest, H, in response to observed evidence e, context E of previously observed evidence, and background state of information $\xi$. An important component of a diagnostic system is identification, at any point in a diagnostic operation, of a best next observation(s) to make or test(s) to perform, based on net expected value of information, NEVI.

NEVI is a difference between a value of observing new information under uncertainty and a cost of making this observation. To compute the value of information, the expected value of the best decision in the world for each value the observation can take on is determined for each observation. Then, generally speaking, the expected utility for each value is summed, weighted by the probabilities of seeing the different values, should the observation be made, i.e. as given by equation (14) as follows:

$$NEVI(e_x, E) = \sum_k p(e_{x,k} \mid E) \left[ \max_A \sum_j u(A_i, H_j) p(H_j \mid E, e_{x,k}) - \max_A \sum_j u(A_i, H_j) p(H_j \mid E) - C(e_x, E) \right] \quad (14)$$

where:
- $e_x$ is an unobserved variable;
- $e_{x,k}$ is a observation of state k when $e_x$ is evaluated;
- u is a utility function; and
- C is the cost associated with observation of variable $e_x$.

As one can readily see, the calculation of NEVI is rather difficult to perform. In that regard, performing this calculation can impose noticeable delays for computation in decision-support systems. Specifically, the computation of NEVI, even if a "Greedy" type analysis is used, requires, for each piece of unobserved evidence, probabilistic inference about an outcome of seeing a spectrum of alternate values should that observation be performed. Thus, multiple computations for each potential test or observation must be considered. However, if each observed piece of evidence, i.e. state, is constrained to have a relatively small number of different probabilistic outcomes, then solving for NEVI becomes much easier. Such a simplification is evident in tree 830 for Application A which, represents various different observations (evidence or symptoms) $Evid_1$, $Evid_2$, . . . , each having a small number of probability defined faults 835 associated therewith, e.g. $p_1$, $p_2$, $p_3$ associated with $Evid_1$; $p_4$ and $p_5$ associated with $Evid_2$, and so forth. Similarly, tree 840 associated with Application B also contains a tree having a small number of faults associated with each observation, e.g. $p_1$, $p_2$, $p_3$, $p_4$ associated with $Evid_1$; $p_5$, $p_6$ and $p_7$ associated with $Evid_2$, and so forth.

With respect to diagnosis, if at any time a relatively small number of different states exist and each state were to have only a few different probabilistic outcomes, then given observations at one cycle in a diagnosis process, then, though successive NEVI calculations, a small number of best new probabilistic observations would be suggested to be made at the new successive observation cycle, and so forth.

With this in mind, system 810 operates by obtaining salient observations, here "symptoms", as symbolized by line 822. In the context of a real-time diagnostic system for locating faults in a functioning computer system, these symptoms would each typically be a given event produced by a fault condition, e.g. an error condition, a failure of a disk write operation and so forth. Based on the observations, block 825 computes the salient probability associated with each symptom for various causes thereof, i.e. actual "diseases" or "faults". To do so, block 825 contains a conventional inference engine, typically a Bayesian network. Once a listing of potential diseases, ranked by associated probabilities, is generated, block 827, though conventional probability analysis, computes the NEVI associated with each disease and selects that likely disease having the largest probability and suggests additional observation(s) to be made to gather information for each such disease. This disease is then removed from the list, with block 827 repeating its operation to suggest an additional observation to make regarding the disease having the next highest probability, and so forth for each of the diseases identified by block 825. Once all these new observations have been made, execution returns, as symbolized by line 829, to block 825, yielding a probabilistically ranked list of symptoms, to analyze these observations to refine the selection of the diseases, and so forth, until system 820 has converged on the particular disease(s) or system fault(s) that have actually occurred.

NEVI calculations are particularly well-suited for idle-time precomputation. Typically, an observation of evidence requires effort and time, which provides variable amounts of idle time for precomputation. Also, the computation of NEVI includes computing $p(e_{x,k} \mid E)$, the probability of future observations, should an observation be made. This information can be used to control the precomputation of NEVI.

The probability of a next observation depends on the way recommendations for observations are presented by diagnosis system 820 to a user. Depending on a user interface to the system, a user may be presented with only a single best next observation to make or as, described immediately above, a list of observations ranked by NEVI to make, either manually, or in the case of system 820, automatically. In the case of one recommended observation, the probability used is simply $p(e_{x,k} \mid E)$, the probability over future instances I. For a list of recommended observations, as shown in FIG. 8, a model of the probability of selection based on factors including a position of the recommended observation in the Bayesian network and/or relative NEVI values can be used. In that regard, the probability of the next observation is the product of the probability of a selected finding y, from a displayed list of such findings to evaluate, and the probability of the next observation given that selection, i.e. $p(y \mid display) \times p(e_{x,k} \mid E, y)$.

If system 820 will compute and cache the probabilities and the recommendations for the best next future observations, and the system has sufficient local memory to store partial results of precomputation and the task instances consume comparable levels of processing resources, then the total time of computation in a next period can be minimized by using a policy that directs the available idle-time to future NEVI calculations for task instances, or here to define subsequent new observations to be made, in order of their computed probabilities. The above-described methods can also be used in conjunction with flexible variants of EVI calculations to refine recommendations for new observations that require increasing amounts of computation.

Furthermore, rather than just selecting among task instances that are independent of an application or those associated with a given application, my invention could be advantageously used, in a multi-tasking environment, to prematurely invoke other applications. In that regard, while one application is executing, particularly on a personal computer, a probability exists that a user will then invoke another such application. This probability will clearly vary widely from one application to the next as well as with the current task then being executed in a current application. For example, if a word processing program is currently executing and a user, through that program, is composing a document, by, e.g., inputting text and/or graphics into a word processing file, a finite probability exists that in view of this current task, the user may well immediately invoke a web browser to obtain information from a web site for subsequent inclusion into the document. Specifically, once a user types a web address (so-called "URL") of a given site into a document, the probability associated with the user then accessing that site during the next operation may well increase. Additionally, a high probability may also exist for the user, during document composition, to re-access a site (s)he has most recently accessed during preparation of that document. As other sites are accessed or time passes without any such access, the probability associated with accessing a particular site that was previously accessed will likely decrease. Additionally, this probability will decrease if, instead of composing a document, the user is formatting a document, saving the document to a file, setting tabs in the program or executing a number of other specific tasks that are basically unrelated to entering information into a document. Inasmuch as significant intervals of idle-time occur during use of, e.g., a word processing program, by, e.g., simply waiting for keyboard or other user input, response time and overall throughput of the program can be significantly enhanced by prematurely initiating, during an idle-time interval, that program, such as a web browser, then exhibiting the highest likelihood of occurrence or $\phi \times p$. In this manner, a web browser can be precomputed, i.e. in this case prematurely invoked, such that it is executing and has already accessed a site and is ready to download information at the instant a user issues an appropriate request to access that site, rather than being first invoked at that time and forcing the user to wait for the browser to initialize and then establish a connection to the desired page of the site. In essence, delay associated with program initialization and site access would occur prematurely and substantially, if not totally, during an idle-time interval, when that delay would neither be apparent to nor adversely affect a user. Of course, if the user did not issue such a request and performed a different operation, then, as time continues to pass, the likelihood or $\phi \times p$ associated with invoking each of these other applications would be dynamically updated to provide a new relative ranking, in terms of likelihood or $\phi \times p$, respectively, of invoking other such applications. Application probabilities, given their task dependency, can be effectively represented by a Bayesian network stored within each application. During the onset of an idle-time interval, a currently executing application would interrogate its Bayesian network and select, in accordance with the algorithms discussed in detail above, an application, if any, for precomputation. The probabilities contained within this network stored within an application could be static or dynamically updated as needed to reflect the current state of that application and/or any other applications then executing as well. The associated probabilities stored within the Bayesian network would be of the following form for currently executing application i, as given by expression (15) below:

$$[p(\text{Application } i \text{ gets assigned}|E_i, \ldots E_n) \times p(I_j|\text{Application } j \text{ gets assigned}|E_i, \ldots E_n)]. \quad (15)$$

where: application j is that application being considered for idle-time precomputation.

As the number of applications that are to be prematurely invoked at any one time increases, the product in expression (15) would be expanded to include additional application probabilities, e.g. three and four terms for respectively three and four such applications and so forth. If the operating system so provides, the probabilities associated with each possible application then available for precomputation could be modified, such as, e.g. through manipulation of a displayed slider, to reflect a user's overall preference and priority among individual applications and/or predefined groups thereof.

Although various embodiments which incorporate the teachings of the present invention have been shown and described in detail herein, those skilled in the art can readily devise many other embodiments that still utilize these teachings.

I claim:

1. A method for use in a computer system, having a processor, for allocating and using currently available processing time comprising the steps of:
   (a) defining a list having a plurality of future task instances, each of said instances having an incremental utility measure associated therewith resulting from allocation of computational resources to execution of said each future task instance;
   (b) ascertaining, for each of said future task instances on said list, a corresponding time-discounted incremental utility measure therefor, said time-discounted utility measure being the incremental utility measure for said each future task discounted for time; and
   (c) if the time-discounted incremental utility measure for one of said future task instances exceeds an incremental utility measure of a currently executing task:
      suspending the currently executing task prior to its completion so as to define a suspended task;
      storing partial results of the suspended task for subsequent use; and
      executing the one future task instance.

2. The method in claim 1 further comprising the step of repeating steps (a)–(c) at the onset of each one of a series of predefined regularly occurring time intervals.

3. The method in claim 2 wherein the executing step comprises the step of executing said one future task instance during said each time interval to the extent of all remaining time in said each time interval.

4. The method in claim 3 wherein the executing step comprises the steps of:
   if the one future task instance completes during the remaining time in said each time interval, storing results of the one future task instance for subsequent use; and
   if the one future task instance does not complete during the remaining time in said each time interval, storing partial results of the one future task instance obtained at a conclusion of said each time interval and suspending the one future task instance.

5. The method in claim 4 wherein the currently executing task has a first utility measure associated therewith and each of the future task instances has a second utility measure and a second probability measure associated therewith, the second probability measure specifying for a given future task instance a probability that the given future task instance will be executed at a future time, the first and second utility measures specifying a utility of partial results provided by the first and second task instances, respectively; and
   wherein the defining step further comprises the step of:
      determining, for the currently executing task, a first associated rate of change in an expected value of computation therefor; and
   wherein the ascertaining step further comprises the step of:
      determining for each of said future task instances a second associated rate of change in an expected value of computation and a time-discounted product of the second utility measure and the second associated rate of change; and the method further comprises the step of:

choosing, amongst all of said future task instances, a particular one of the future task instances, as said one future task instance, then having a largest time-discounted product associated therewith which exceeds the first associated rate of change.

6. The method in claim 5 wherein the first associated rate of change is a pre-defined function of the first utility measure; and the second associated rate of change is a pre-defined function of the second probability measure and the second utility measure.

7. The method in claim 6 wherein the time-discount product ascertaining step comprises the steps of, for each of said future task instances in the list:

determining a corresponding second associated rate of change in the expected value of computation, as a function of the corresponding ones of both of the second probability measures and the second utility measures; and forming the time-discounted product as a product of a pre-defined numeric factor, the corresponding second associated rate of change and the second corresponding probability measure.

8. The method in claim 7 wherein the first associated rate of change is a pre-defined function of the first utility measure; and the second associated rate of change is a pre-defined function of the second probability measure and the second utility measure.

9. The method in claim 7 wherein the predefined factor, d is a predetermined number in a range $0<d\leq 1$.

10. The method in claim 7 wherein the executing step comprises the step of executing said one future task instance during said each time interval to the extent of all remaining time in said each time interval.

11. The method in claim 10 wherein the executing step further comprises the steps of:

if the one future task instance completes during the remaining time in said each time interval, storing results of the one future task instance for subsequent use; and if the one future task instance does not complete during the remaining time in said each time interval, storing partial results of the one future task instance obtained at a conclusion of said each time interval and terminating the one future task instance.

12. The method in claim 7 wherein the associated first utility measure and the second utility measure, for any one of said plurality of future task instances, are each a corresponding stored value, a corresponding stored function or a corresponding stored look-up table, and the first associated rate of change ascertaining step comprises the step of reading the corresponding stored value, evaluating the corresponding stored function or accessing the corresponding look-up table, respectively, to yield a numeric value of the first utility measure; and the corresponding second associated rate of change determining step comprises the step of reading the corresponding stored value, evaluating the corresponding stored function or accessing the corresponding look-up table, respectively, to yield a numeric value of the second utility measure.

13. The method of claim 7 further comprising the step of updating the list by adding each new future task instance to the list once said new future task instance is spawned.

14. The method of claim 12 wherein the new future task instance is spawned by an application program or an operating system then executing on said processor.

15. The method of claim 14 wherein the selecting step further comprises the steps of:

evaluating a probability tree to determine a corresponding numeric value for the probability measure for each of said future task instances in said list; and selecting a future task instance, from among the future task instances in the list, having largest corresponding numeric value for the associated probability measure as said one future task instance.

16. The method in claim 15 wherein the first associated rate of change is a pre-defined function of the first utility measure; and the second associated rate of change is a pre-defined function of the second probability measure and the second utility measure.

17. The method of claim 16 further comprising the step of determining probabilities in the tree through a Bayesian network or a Hidden-Markov model.

18. The method of claim 16 further comprising the step of updating the list by adding each new future task instance to the list once said new future task instance is spawned.

19. The method of claim 17 wherein the new future task instance is spawned by an application program or an operating system then executing on said processor.

20. A computer readable medium having computer executable instructions stored therein for performing the steps of claim 1.

21. Apparatus for use in a computer system, having a processor, for allocating and using currently available processing time comprising:

the processor; and a memory having executable instructions stored therein; and wherein the processor, in response to the instructions stored therein:

(a) defines a list having a plurality of future task instances, each of said instances having an incremental utility measure associated therewith resulting from allocation of computational resources to execution of said each future task instance;

(b) ascertains, for each of said future task instances on said list, a corresponding time-discounted incremental utility measure therefor, said time-discounted utility measure being the incremental utility measure for said each future task discounted for time; and (c) if the time-discounted incremental utility measure for one of said future task instances exceeds an incremental utility measure of a currently executing task:

suspends the currently executing task prior to its completion so as to define a suspended task;

stores partial results of the suspended task for subsequent use; and executes the one future task instance.

22. The apparatus in claim 21 wherein the processor, in response to the stored instructions, repeats operations (a)–(c) at the onset of each one of a series of predefined regularly occurring time intervals.

23. The apparatus in claim 22 wherein the processor, in response to the stored instructions, executes said one future task instance during said each time interval to the extent of all remaining time in said each time interval.

24. The apparatus in claim 23 wherein the processor, in response to the stored instructions:

if the one future task instance completes during the remaining time in said each time interval, stores results of the one future task instance for subsequent use; and if the one future task instance does not complete during the remaining time in said each time interval, stores partial results of the one future task instance obtained at a conclusion of said each time interval and suspends the one future task instance.

25. The apparatus in claim 24 wherein the currently executing task has a first utility measure associated therewith and each of the future task instances has a second utility measure and a second probability measure associated therewith, the second probability measure specifying for a given future task instance a probability that the given future task instance will be executed at a future time, the first and second utility measures specifying a utility of partial results provided by the first and second task instances, respectively; and wherein the processor, in response to the stored instructions:
determines, for the currently executing task, a first associated rate of change in an expected value of computation therefor;
determines for each of said future task instances a second associated rate of change in an expected value of computation and a time-discounted product of the second utility measure and the second associated rate of change; and
chooses, amongst all of said future task instances, a particular one of the future task instances, as said one future task instance, then having a largest time-discounted product associated therewith which exceeds the first associated rate of change.

26. The apparatus in claim 25 wherein the first associated rate of change is a pre-defined function of the first utility measure; and the second associated rate of change is a pre-defined function of the second probability measure and the second utility measure.

27. The apparatus in claim 26 wherein the processor, in response to the stored instructions and for each of said future task instances in the list:
determines a corresponding second associated rate of change in the expected value of computation, as a function of the corresponding ones of both of the second probability measures and the second utility measures; and
forms the time-discounted product as a product of a pre-defined numeric factor, the corresponding second associated rate of change and the second corresponding probability measure.

28. The apparatus in claim 27 wherein the first associated rate of change is a pre-defined function of the first utility measure; and the second associated rate of change is a pre-defined function of the second probability measure and the second utility measure.

29. The apparatus in claim 27 wherein the predefined factor, d, is a predetermined number in a range $0<d\leq1$.

30. The apparatus in claim 27 wherein processor, in response to the stored instructions, executes said one future task instance during said each time interval to the extent of all remaining time in said each time interval.

31. The apparatus in claim 30 wherein the processor, in response to the stored instructions:
if the one future task instance completes during the remaining time in said each time interval, stores results of the one future task instance for subsequent use; and
if the one future task instance does not complete during the remaining time in said each time interval, stores partial results of the one future task instance obtained at a conclusion of said each time interval and suspends the one future task instance.

32. The apparatus in claim 27 wherein the associated first utility measure and the second utility measure, for any one of said plurality of future task instances, are each a corresponding stored value, a corresponding stored function or a corresponding stored look-up table, and the processor, in response to the stored instructions:
reads the corresponding stored value, evaluates the corresponding stored function or accesses the corresponding look-up table, respectively, to yield a numeric value of the first utility measure; and
reads the corresponding stored value, evaluates the corresponding stored function or accesses the corresponding look-up table, respectively, to yield a numeric value of the second utility measure.

33. The apparatus of claim 27 wherein the processor, in response to the stored instructions, updates the list by adding each new future task instance to the list once said new future task instance is spawned.

34. The apparatus of claim 32 wherein the new future task instance is spawned by an application program or an operating system then executing on said processor.

35. The apparatus of claim 34 wherein the processor, in response to the stored instructions:
evaluates a probability tree to determine a corresponding numeric value for the probability measure for each of said future task instances in said list; and
selects a future task instance, from among the future task instances in the list, having largest corresponding numeric value for the associated probability measure as said one future task instance.

36. The apparatus in claim 35 wherein the first associated rate of change is a pre-defined function of the first utility measure; and the second associated rate of change is a pre-defined function of the second probability measure and the second utility measure.

37. The apparatus of claim 36 wherein the processor, in response to the stored instructions, determines probabilities in the tree through a Bayesian network or a Hidden-Markov model.

38. The apparatus of claim 36 wherein the processor, in response to stored instructions, updates the list by adding each new future task instance to the list once said new future task instance is spawned.

39. The apparatus of claim 37 wherein the new future task instance is spawned by an application program or an operating system then executing on said processor.

* * * * *

UNITED STATES PATENT AND TRADEMARK OFFICE
CERTIFICATE OF CORRECTION

PATENT NO. : 5,995,997
DATED : November 30, 1999
INVENTOR(S) : Eric HORVITZ

It is certified that error appears in the above-identified patent and that said Letters Patent is hereby corrected as shown below:

Column 5, line 46     After "just" insert --minimizing--;

Column 10, line 43     After "instance" insert --from--;

Column 10, line 54     After "measures" insert --$P_{12}$ and $P_{13}$--;

Column 10, line 57     After "tasks," insert --having the then highest measure--;

Column 12, line 18     Replace equation with:
$$-- \sum_j p(T_j) \sum_i p(l_i \setminus E)[t(l_i) - T_j t_i^f] --;$$

Column 13, line 31     Change "T≤t($I_i$)" to --T≤t($I_i$)--;

Column 13, line 33     Replace equation with:
--($I_i$, t($I_i$) -T)]--;

Column 14, line 16     Change "the" to --an expected--;

Column 14, line 17     Change "increased computation." to --computation, i.e., a product of the value of refinement of that result with computation multiplied by its probability of occurrence.--;

UNITED STATES PATENT AND TRADEMARK OFFICE
CERTIFICATE OF CORRECTION

PATENT NO. : 5,995,997
DATED : November 30, 1999
INVENTOR(S) : Eric HORVITZ

It is certified that error appears in the above-identified patent and that said Letters Patent is hereby corrected as shown below:

Column 14, line 42  Replace equation with:
--$NEVC[S_i, \pi(I), t] = EVC[S_i, \pi(I), t] - C(t)$--;

Column 14, line 59  Change "change" to --refinement (change)--;

Column 14, line 60  After "with" insert --continued--;

Column 15, line 15  Change "is to select" to --to select and precompute--;

Column 15, line 21  Before "so" insert --precomputed and--;

Column 15, line 42  Change "constant" to --linear--;

Column 16, line 58  Replace equation with:
--$\int_{t^r} p(t^r \setminus t^e)[EVC_2(t^r)p(I_2) - EVC_1(t^r)p(I_1)]dt^r - Cost^S$--;

Column 17, line 4  Change "$P(I_1)$" to --$P(I_1)C_1$--;

Column 17, line 5  Change "$P(I_2)$" to --$P(I_2)C_2$--;

Column 17, line 17  Replace equation with:
--$t^r > \dfrac{Cost^S}{C_2 p(I_2) - C_1 P(I_1)}$--;

UNITED STATES PATENT AND TRADEMARK OFFICE
CERTIFICATE OF CORRECTION

PATENT NO. : 5,995,997
DATED : November 30, 1999
INVENTOR(S) : Eric HORVITZ

It is certified that error appears in the above-identified patent and that said Letters Patent is hereby corrected as shown below:

Column 18, line 15  Replace equation with:

$$d[\sum_{T=0}^{t(I_1)-t_a} p(T)\phi_1 \Delta tp(I_1 \setminus E) + \sum_{T=t(I_1)-t_a}^{t(I_1)+t(I_2)-t_a} p(T)\phi_2 \Delta tp(I_2 \setminus E) + ... + \sum_{t=\sum_{i=1}^{n}t(I_i)-t_a}^{\sum_{i=1}^{n+1}t(I_i)-t_a} p(T)\phi_n \Delta tp(I_n \setminus E)]$$

Column 18, line 25  Replace equation with:
-- ($0 < d \leq 1$) --;

Column 19, line 15  Change "EVP" to --EVC--;

Column 21, line 42  Delete "Each possible task instance occupies a corresponding node in the network with a link between two such nodes signifying a joint probability therebetween. The hierarchical distribution of nodes represents corresponding layers of inter-dependency of the possible task instances. Those application task instances occupying higher levels of the network would be less dependent on other application task instances than

UNITED STATES PATENT AND TRADEMARK OFFICE
CERTIFICATE OF CORRECTION

PATENT NO. : 5,995,997
DATED : November 30, 1999
INVENTOR(S) : Eric HORVITZ

It is certified that error appears in the above-identified patent and that said Letters Patent is hereby corrected as shown below:

those situated lower in the network."

Column 22, line 64  Change "6501" to --$650_1$--;

Column 22, line 66  After "620" insert --and, from there,--;

Column 25, line 11  Replace equation with:
--
$$NEVI(e_x, E) = \sum_k p(e_{x,k} \backslash E)[\max_A \sum_j u(A_i, H_j) p(H_j \backslash E, e_{x,k}) - \max_A \sum_j u(A_i, H_j) p(H_j \backslash E) - C(e_x, E)]$$
--;

Column 25, line 48  Delete "then,";

Column 25, line 49  Change "though" to --through--; and

Column 27, line 56  Replace equation with:
--$[p(Application\ i\ gets\ assigned \backslash E_i, ... E_n) xp(I_j \backslash Application\ j\ gets\ assigned \backslash E_i, ..., E_n)]$--.